United States Patent
Takahashi et al.

(10) Patent No.: US 11,202,283 B2
(45) Date of Patent: *Dec. 14, 2021

(54) USER APPARATUS, BASE STATION AND INFORMATION RECEPTION METHOD

(71) Applicant: NTT DOCOMO, INC., Tokyo (JP)

(72) Inventors: Hideaki Takahashi, Tokyo (JP); Kohei Kiyoshima, Tokyo (JP); Takahiro Takiguchi, Tokyo (JP); Masaaki Ohtake, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/579,677

(22) PCT Filed: Jun. 9, 2016

(86) PCT No.: PCT/JP2016/067226
§ 371 (c)(1),
(2) Date: Dec. 5, 2017

(87) PCT Pub. No.: WO2016/199855
PCT Pub. Date: Dec. 15, 2016

(65) Prior Publication Data
US 2018/0139750 A1  May 17, 2018

(30) Foreign Application Priority Data

Jun. 11, 2015 (JP) .............................. JP2015-118723
Jun. 16, 2015 (JP) .................................. 2015-121509

(51) Int. Cl.
*H04W 72/04* (2009.01)
*H04W 16/28* (2009.01)
(Continued)

(52) U.S. Cl.
CPC ...... *H04W 72/0413* (2013.01); *H04B 7/0413* (2013.01); *H04B 7/0486* (2013.01);
(Continued)

(58) Field of Classification Search
None
See application file for complete search history.

(56) References Cited

U.S. PATENT DOCUMENTS

2011/0243079 A1* 10/2011 Chen .................... H04B 7/0639
370/329
2012/0307648 A1* 12/2012 Okubo .................. H04W 72/06
370/241
(Continued)

FOREIGN PATENT DOCUMENTS

CN         103597892 A    2/2014
EP           2739107 A1    6/2014
(Continued)

OTHER PUBLICATIONS

International Search Report of the International Searching Authority issued in PCT/JP2016/067226 dated Aug. 16, 2016 (5 pages).
(Continued)

*Primary Examiner* — Saumit Shah
(74) *Attorney, Agent, or Firm* — Osha Bergman Watanabe & Burton LLP

(57) ABSTRACT

A user apparatus configured to perform communication with a base station in a mobile communication system that supports carrier aggregation, including: transmission means configured to transmit, to the base station, the number of layers for each of component carriers that form the carrier aggregation as information of downlink MIMO capability; and reception means configured to receive, from the base station, the number of layers that is used for determining a
(Continued)

bit width of a rank indicator for each of the component carriers that form the carrier aggregation.

3 Claims, 20 Drawing Sheets

(51) Int. Cl.
| | | |
|---|---|---|
| *H04B 7/0413* | (2017.01) | |
| *H04B 7/06* | (2006.01) | |
| *H04W 8/24* | (2009.01) | |
| *H04W 72/12* | (2009.01) | |
| *H04L 5/00* | (2006.01) | |
| *H04B 7/0456* | (2017.01) | |
| *H04W 72/06* | (2009.01) | |

(52) U.S. Cl.
CPC ............... *H04B 7/06* (2013.01); *H04L 5/001* (2013.01); *H04L 5/0053* (2013.01); *H04W 8/24* (2013.01); *H04W 16/28* (2013.01); *H04W 72/1278* (2013.01); *H04W 72/06* (2013.01)

(56) References Cited

U.S. PATENT DOCUMENTS

| | | | | |
|---|---|---|---|---|
| 2013/0165183 | A1* | 6/2013 | Gerstenberger | H04L 1/1835 455/561 |
| 2014/0045497 | A1* | 2/2014 | Abe | H04L 1/0067 455/435.1 |
| 2014/0146697 | A1 | 5/2014 | Kim et al. | |
| 2014/0369308 | A1 | 12/2014 | Gerstenberger et al. | |
| 2015/0318907 | A1* | 11/2015 | Zhang | H04B 7/063 375/267 |
| 2016/0007212 | A1* | 1/2016 | Kim | H04B 7/0452 370/254 |
| 2016/0192350 | A1* | 6/2016 | Yi | H04W 52/146 370/329 |
| 2016/0374069 | A1* | 12/2016 | Palm | H04L 5/001 |

FOREIGN PATENT DOCUMENTS

| | | |
|---|---|---|
| EP | 2930969 A1 | 10/2015 |
| JP | 2012-222444 A | 11/2012 |
| WO | 2014110807 A1 | 7/2014 |

OTHER PUBLICATIONS

Written Opinion of the International Searching Authority issued in PCT/JP2016/067226 dated Aug. 16, 2016 (4 pages).
Japanese Office Action w/translation for corresponding Japanese Application No. 2015-121509 dated Aug. 9, 2016 (6 pages).
Intel; "Summary of email discussion [90#01][LTE/CA] MIMO/CSI capability for intra-band contiguous CA"; 3GPP TSG-RAN WG2 #91, R2-153265; Beijing, China; Aug. 24-28, 2015 (13 pages).
3GPP TS 36.331 V12.5.0; "3rd Generation Partnership Project; Technical Specification Group Radio Access Network Evolved Universal Terrestrial Radio Access (E-UTRA); Radio Resource Control (RRC); Protocol Specification Release 12)"; Mar. 2015 (445 pages).
3GPP TS 36.101 V12.7.0; "3rd Generation Partnership Project; Technical Specification Group Radio Access Network Evolved Universal Terrestrial Radio Access (E-UTRA);User Equipment (UE) radio transmission and reception (Release 12)"; Mar. 2015 (659 pages).
Intel Corporation, et al; "Additional MIMO/CSI capability for intra-band contiguous CA"; 3GPP TSG-RAN WG2 #90, R2-152921; Fukuoka, Japan; May 25-29, 2015 (21 pages).
3GPP TS 36.212 V12.4.0; "3rd Generation Partnership Project; Technical Specification Group Radio Access Network Evolved Universal Terrestrial Radio Access (E-UTRA); Multiplexing and channel coding (Release 12)"; Mar. 2015 (94 pages).
3GPP TS 36.306 V12.4.0; "3rd Generation Partnership Project; Technical Specification Group Radio Access Network Evolved Universal Terrestrial Radio Access (E-UTRA); User Equipment (UE) radio access capabilities (Release 12)" Mar. 2015 (41 pages).
Extended European Search Report issued in the counterpart European Patent Application No. 16807561.2, dated May 23, 2018 (8 pages).
Samsung; "Discussion on RI bit-width"; 3GPP TSG RAN1 #72bis R1-130995; Chicago, USA, Apr. 15-19, 2013 (2 pages).
Office Action in counterpart Chinese Patent Application No. 201680033231.X dated Oct. 23, 2013 (17 pages).
Office Action in counterpart Chinese Patent Application No. 201680033231.X issued on Jun. 1, 2021 (8 pages).

\* cited by examiner

FIG.3  (Prior Art)

Table 5.6A-1: CA bandwidth classes and corresponding nominal guard bands (TS36.101)

| CA Bandwidth Class | Aggregated Transmission Bandwidth Configuration | Maximum number of CC | Nominal Guard Band $BW_{GB}$ |
|---|---|---|---|
| A | $N_{RB,agg} \leq 100$ | 1 | $a_1 BW_{Channel(1)} - 0.5\Delta f_1$ (NOTE 2) |
| B | $25 < N_{RB,agg} \leq 100$ | 2 | $0.05\ max(BW_{Channel(1)}, BW_{Channel(2)}) - 0.5\Delta f_1$ |
| C | $100 < N_{RB,agg} \leq 200$ | 2 | $0.05\ max(BW_{Channel(1)}, BW_{Channel(2)}) - 0.5\Delta f_1$ |
| D | $200 < N_{RB,agg} \leq [300]$ | FFS | FFS |
| E | $[300] < N_{RB,agg} \leq [400]$ | FFS | FFS |
| F | $[400] < N_{RB,agg} \leq [500]$ | FFS | FFS |

NOTE 1: $BW_{Channel(1)}$ and $BW_{Channel(2)}$ are channel bandwidths of two E-UTRA component carriers according to Table 5.6-1 and $\Delta f_1 = \Delta f$ for the downlink with $\Delta f$ the subcarrier spacing while $\Delta f_1 = 0$ for the uplink.

NOTE 2: $a_1 = 0.16/1.4$ for $BW_{Channel(1)} = 1.4$ MHz whereas $a_1 = 0.05$ for all other channel bandwidths.

FIG.6

| Field | Bit width | | | | | |
|---|---|---|---|---|---|---|
| | 2 antenna ports | 4 antenna ports | | 8 antenna ports | | |
| | | Max 2 layers | Max 4 layers | Max 2 layers | Max 4 layers | Max 8 layers |
| Rank indication | 1 | 1 | 2 | 1 | 2 | 3 |

FIG.9

```
                    ┌─ S201
NOTIFY OF {4, 2} AS NUMBERS OF MIMO LAYERS FOR 2CCs
                    │
                    ▼   ┌─ S202
DETERMINE RI BIT WIDTH
BASED ON THE MAXIMUM NUMBERS OF MIMO LAYERS
                    │
                    ▼   ┌─ S203
TRANSMIT RI FOR EACH CC
USING THE DETERMINED RI BIT WIDTH
```

FIG.10

For rank indication (RI) (RI only, joint report of RI and i1, and joint report of RI and PTI)

- The corresponding bit widths for RI feedback for PDSCH transmissions are given by Tables 5.2.2.6.1-2, 5.2.2.6.2-3, 5.2.2.6.3-3, 5.2.3.3.1-3, 5.2.3.3.1-3A, 5.2.3.3.2-4, and 5.2.3.3.2-4A, which are determined assuming the maximum number of layers as follows:

o  <u>If the UE is configured with transmission mode 9, and the *supportedMIMO-CapabilityDL-r12* field is included in the *UE-EUTRA-Capability*, the maximum number of layers is determined according to the minimum of the configured number of CSI-RS ports and the maximum of the reported UE downlink MIMO capabilities among the *supportedMIMO-CapabilityDL-r12* fields in the *intraBandContiguousCC-Info-r12* field for the corresponding bandwidth class in the corresponding band combination.</u>
  o  If the UE is configured with transmission mode 9, and the *supportedMIMO-CapabilityDL-r10* field is included in the *UE-EUTRA-Capability*, the maximum number of layers is determined according to the minimum of the configured number of CSI-RS ports and the maximum of the reported UE downlink MIMO capabilities for the same band in the corresponding band combination.
  o  If the UE is configured with transmission mode 9, and the *supportedMIMO-CapabilityDL-r10* field is not included in the *UE-EUTRA-Capability*, the maximum number of layers is determined according to the minimum of the configured number of CSI-RS ports and *ue-Category*.
  o  Otherwise the maximum number of layers is determined according to the minimum of the number of PBCH antenna ports and *ue-Category*.

FIG.11

For rank indication (RI) (RI only, joint report of RI and i1, and joint report of RI and PTI)

- The corresponding bit widths for RI feedback for PDSCH transmissions are given by Tables 5.2.2.6.1-2, 5.2.2.6.2-3, 5.2.2.6.3-3, 5.2.3.3.1-3, 5.2.3.3.1-3A, 5.2.3.3.2-4, and 5.2.3.3.2-4A, which are determined assuming the maximum number of layers as follows:

o   If the UE is configured with transmission mode 9, and the *supportedMIMO-CapabilityDL-r10* field is included in the *UE-EUTRA-Capability*, the maximum number of layers is determined according to the minimum of the configured number of CSI-RS ports and the maximum of the reported UE downlink MIMO capabilities for the same band in the corresponding band combination.
    o   If the UE is configured with transmission mode 9, and the *supportedMIMO-CapabilityDL-r10* field is not included in the *UE-EUTRA-Capability*, the maximum number of layers is determined according to the minimum of the configured number of CSI-RS ports and *ue-Category* (without suffix).
    o   If the UE is configured with transmission mode 9, and the *supportedMIMO-CapabilityDL-r12* field is included in the *UE-EUTRA-Capability*, the maximum number of layers for each component carrier in the intra-band contiguous band combination is determined according to the minimum of the configured number of CSI-RS ports and the maximum number of reported UE downlink MIMO capabilities among the *supportedMIMO-CapabilityDL-r12* fields in the *intraBandContiguousCC-Info-r12* field for the corresponding bandwidth class in the corresponding band combination.
    o   If the UE is configured with transmission mode 10, and the *supportedMIMO-CapabilityDL-r10* field is included in the *UE-EUTRA-Capability*, the maximum number of layers for each CSI process is determined according to the minimum of the configured number of CSI-RS ports for that CSI process and the maximum of the reported UE downlink MIMO capabilities for the same band in the corresponding band combination.
    o   If the UE is configured with transmission mode 10, and the *supportedMIMO-CapabilityDL-r10* field is not included in the *UE-EUTRA-Capability*, the maximum number of layers for each CSI process is determined according to the minimum of the configured number of CSI-RS ports for that CSI process and *ue-Category* (without suffix).
    o   If the UE is configured with transmission mode 10, and the *supportedMIMO-CapabilityDL-r12* field is included in the *UE-EUTRA-Capability*, the maximum number of layers for each CSI process for each component carrier in the intra-band contiguous band combination is determined according to the minimum of the configured number of CSI-RS ports for that CSI process and the maximum of the reported UE downlink MIMO capabilities among the *supportedMIMO-CapabilityDL-r12* fields in the *intraBandContiguousCC-Info-r12* field for the corresponding bandwidth class in the corresponding band combination.
    o   Otherwise the maximum number of layers is determined according to the minimum of the number of PBCH antenna ports and *ue-Category* (without suffix).

FIG.13

| |
|---|
| For rank indication (RI) (RI only, joint report of RI and i1, and joint report of RI and PTI) |
| – The corresponding bit widths for RI feedback for PDSCH transmissions are given by Tables 5.2.2.6.1-2, 5.2.2.6.2-3, 5.2.2.6.3-3, 5.2.3.3.1-3, 5.2.3.3.1-3A, 5.2.3.3.2-4, and 5.2.3.3.2-4A, which are determined assuming the maximum number of layers as follows:<br><br> o If the UE is configured with transmission mode 9, and the *supportedMIMO-CapabilityDL-r12* field is included in the *UE-EUTRA-Capability*, the maximum number of layers for each component carrier in the intra-band contiguous band combination is configured by higher layers.<br> o If the UE is configured with transmission mode 9, and the *supportedMIMO-CapabilityDL-r10* field is included in the *UE-EUTRA-Capability*, the maximum number of layers is determined according to the minimum of the configured number of CSI-RS ports and the maximum of the reported UE downlink MIMO capabilities for the same band in the corresponding band combination.<br> o If the UE is configured with transmission mode 9, and the *supportedMIMO-CapabilityDL-r10* field is not included in the *UE-EUTRA-Capability*, the maximum number of layers is determined according to the minimum of the configured number of CSI-RS ports and *ue-Category*.<br> o Otherwise the maximum number of layers is determined according to the minimum of the number of PBCH antenna ports and *ue-Category*. |

FIG.14

```
- PhysicalConfigDedicated
The IE PhysicalConfigDedicated is used to specify the UE specific physical channel configuration.

PhysicalConfigDedicated information element

-- ASN1START

PhysicalConfigDedicated ::=      SEQUENCE {
    pdsch-ConfigDedicated              PDSCH-ConfigDedicated        OPTIONAL,     -- Need ON
    pucch-ConfigDedicated              PUCCH-ConfigDedicated        OPTIONAL,     -- Need ON
    pusch-ConfigDedicated              PUSCH-ConfigDedicated        OPTIONAL,     -- Need ON
    uplinkPowerControlDedicated        UplinkPowerControlDedicated  OPTIONAL,     -- Need ON
    tpc-PDCCH-ConfigPUCCH              TPC-PDCCH-Config             OPTIONAL,     -- Need ON
    tpc-PDCCH-ConfigPUSCH              TPC-PDCCH-Config             OPTIONAL,     -- Need ON
```

```
        pusch-ConfigDedicated-v1250  PUSCH-ConfigDedicated-v1250 OPTIONAL,    -- Need ON
        csi-RS-Config-v1250          CSI-RS-Config-v1250         OPTIONAL     -- Need ON
    ]],
    [[  cqi-ReportConfigPCell-v12xy  CQI-ReportConfig-v12xy      OPTIONAL,    -- Need ON
    ]]
}
PhysicalConfigDedicatedSCell-r10 ::=    SEQUENCE {
    -- DL configuration as well as configuration applicable for DL and UL
    nonUL-Configuration-r10          SEQUENCE {
        antennaInfo-r10                     AntennaInfoDedicated-r10 OPTIONAL,   -- Need ON
        crossCarrierSchedulingConfig-r10    CrossCarrierSchedulingConfig-r10 OPTIONAL,
-- Need ON
```

```
    [[  antennaInfo-v1250                AntennaInfoDedicated-v1250  OPTIONAL,   -- Need ON
        eimta-MainConfigSCell-r12        EIMTA-MainConfigServCell-r12 OPTIONAL,  -- Need ON
        cqi-ReportConfigSCell-v1250      CQI-ReportConfig-v1250      OPTIONAL,   -- Need ON
        uplinkPowerControlDedicatedSCell-v1250  UplinkPowerControlDedicated-v1250   OPTIONAL,
-- Need ON
        csi-RS-Config-v1250              CSI-RS-Config-v1250         OPTIONAL    -- Need ON
    ]],
    [[  cqi-ReportConfigSCell-v12xy     CQI-ReportConfig-v12xy      OPTIONAL,    -- Need ON
    ]]
}

CSI-RS-ConfigNZPToAddModList-r11 ::= SEQUENCE (SIZE (1..maxCSI-RS-NZP-r11)) OF
CSI-RS-ConfigNZP-r11

CSI-RS-ConfigNZPToReleaseList-r11 ::=   SEQUENCE (SIZE (1..maxCSI-RS-NZP-r11)) OF
CSI-RS-ConfigNZPId-r11

CSI-RS-ConfigZPToAddModList-r11 ::= SEQUENCE (SIZE (1..maxCSI-RS-ZP-r11)) OF
CSI-RS-ConfigZP-r11

CSI-RS-ConfigZPToReleaseList-r11 ::= SEQUENCE (SIZE (1..maxCSI-RS-ZP-r11)) OF
CSI-RS-ConfigZPId-r11

-- ASN1STOP
```

FIG.15A

```
-   CQI-ReportConfig
The IE CQI-ReportConfig is used to specify the CQI reporting configuration.

CQI-ReportConfig information elements

-- ASN1START

CQI-ReportConfig ::=            SEQUENCE {
```

```
    cqi-ReportAperiodic-v1250   CQI-ReportAperiodic-v1250       OPTIONAL,   -- Need ON
    altCQI-Table-r12            ENUMERATED {
                                    allSubframes, csi-SubframeSet1,
                                    csi-SubframeSet2, spare1}   OPTIONAL    -- Need OP
}

CQI-ReportConfig-v12xy ::=  SEQUENCE {
    cqi-ReportBoth-v12xy                CQI-ReportBoth-v12xy
}

CQI-ReportConfigSCell-r10 ::=           SEQUENCE {
    cqi-ReportModeAperiodic-r10         CQI-ReportModeAperiodic     OPTIONAL,   -- Need OR
    nomPDSCH-RS-EPRE-Offset-r10             INTEGER (-1..6),
    cqi-ReportPeriodicSCell-r10         CQI-ReportPeriodic-r10      OPTIONAL,   -- Need ON
```

```
CQI-ReportBoth-v1250 ::=        SEQUENCE {
    csi-IM-ConfigToReleaseListExt-r12   CSI-IM-ConfigId-v1250       OPTIONAL,   -- Need ON
    csi-IM-ConfigToAddModListExt-r12    CSI-IM-ConfigExt-r12        OPTIONAL    -- Need ON
}

CQI-ReportBoth-v1250 ::=        SEQUENCE {
    maxLayers-PMI-RI-report-r12     ENUMERATED {twoLayers, fourLayers, eightLayers}
}

CSI-IM-ConfigToAddModList-r11 ::=    SEQUENCE (SIZE (1..maxCSI-IM-r11)) OF CSI-IM-Config-r11

CSI-IM-ConfigToReleaseList-r11 ::=   SEQUENCE (SIZE (1..maxCSI-IM-r11)) OF CSI-IM-ConfigId-r11

CSI-ProcessToAddModList-r11 ::= SEQUENCE (SIZE (1..maxCSI-Proc-r11)) OF CSI-Process-r11

CSI-ProcessToReleaseList-r11 ::=SEQUENCE (SIZE (1..maxCSI-Proc-r11)) OF CSI-ProcessId-r11

CQI-ReportBothProc-r11 ::=      SEQUENCE {
    ri-Ref-CSI-ProcessId-r11        CSI-ProcessId-r11           OPTIONAL,   -- Need OR
    pmi-RI-Report-r11               ENUMERATED {setup}.         OPTIONAL    -- Need OR
}

-- ASN1STOP
```

FIG.15B

| CQI-ReportConfig field descriptions |
|---|
| *maxLayers-PMI-RI-report* <br> Indicates the maximum number of layers used to determine the rank indication bit width as specified in TS 36.212. |

FIG.16A

```
-  CQI-ReportConfig
The IE CQI-ReportConfig is used to specify the CQI reporting configuration.

CQI-ReportConfig information elements

-- ASN1START
<< skip unchanged part >>
CQI-ReportConfig-v12xy ::=   SEQUENCE {
    cqi-ReportBoth-v12xy              CQI-ReportBoth-v12xy
}
<< skip unchanged part >>
CQI-ReportBoth-v12xy ::=          SEQUENCE {
    maxLayers-RI-report-r12       ENUMERATED {twoLayers, fourLayers, eightLayers}
}
<< skip unchanged part >>
-- ASN1STOP
```

FIG.16B

| CQI-ReportConfig field descriptions |
|---|
| *maxLayers-RI-report* <br> Indicates the maximum number of layers used to determine the rank indication bit width according to TS 36.212 [22]. |

FIG.17

For rank indication (RI) (RI only, joint report of RI and i1, and joint report of RI and PTI)

- The corresponding bit widths for RI feedback for PDSCH transmissions are given by Tables 5.2.2.6.1-2, 5.2.2.6.2-3, 5.2.2.6.3-3, 5.2.3.3.1-3, 5.2.3.3.1-3A, 5.2.3.3.2-4, and 5.2.3.3.2-4A, which are determined assuming the maximum number of layers as follows:

o  If the UE is configured with transmission mode 9, and the *supportedMIMO-CapabilityDL-r10* field is included in the *UE-EUTRA-Capability*, the maximum number of layers is determined according to the minimum of the configured number of CSI-RS ports and the maximum of the reported UE downlink MIMO capabilities for the same band in the corresponding band combination.
    o  If the UE is configured with transmission mode 9, and the *supportedMIMO-CapabilityDL-r10* field is not included in the *UE-EUTRA-Capability*, the maximum number of layers is determined according to the minimum of the configured number of CSI-RS ports and *ue-Category* (without suffix).
    o  If the UE is configured with transmission mode 9, and the *supportedMIMO-CapabilityDL-r12* field is included in the *UE-EUTRA-Capability*, the maximum number of layers for each component carrier in the intra-band contiguous band combination is determined according to the minimum of the configured number of CSI-RS ports and the configured number of maximum layers indicated by the *maxLayers-RI-report-r12* field to the UE.
    o  If the UE is configured with transmission mode 10, and the *supportedMIMO-CapabilityDL-r10* field is included in the *UE-EUTRA-Capability*, the maximum number of layers for each CSI process is determined according to the minimum of the configured number of CSI-RS ports for that CSI process and the maximum of the reported UE downlink MIMO capabilities for the same band in the corresponding band combination.
    o  If the UE is configured with transmission mode 10, and the *supportedMIMO-CapabilityDL-r10* field is not included in the *UE-EUTRA-Capability*, the maximum number of layers for each CSI process is determined according to the minimum of the configured number of CSI-RS ports for that CSI process and *ue-Category* (without suffix).
    o  If the UE is configured with transmission mode 10, and the *supportedMIMO-CapabilityDL-r12* field is included in the *UE-EUTRA-Capability*, the maximum number of layers for each CSI process for each component carrier in the intra-band contiguous band combination is determined according to the minimum of the configured number of CSI-RS ports for that CSI process and the configured number of maximum layers indicated by the *maxLayers-RI-report-r12* field to the UE.
    o  Otherwise the maximum number of layers is determined according to the minimum of the number of PBCH antenna ports and *ue-Category* (without suffix).

FIG.18

| |
|---|
| For rank indication (RI) (RI only, joint report of RI and i1, and joint report of RI and PTI) |
|    –    The corresponding bit widths for RI feedback for PDSCH transmissions are given by Tables 5.2.2.6.1-2, 5.2.2.6.2-3, 5.2.2.6.3-3, 5.2.3.3.1-3, 5.2.3.3.1-3A, 5.2.3.3.2-4, and 5.2.3.3.2-4A, which are determined assuming the maximum number of layers as follows: <br><br>       o   <u>If the UE is configured with transmission mode 9, and the *supportedMIMO-CapabilityDL-r12* field is included in the *UE-EUTRA-Capability*, the RI bit widths for each component carrier in the intra-band contiguous band combination is configured by higher layers.</u> <br>       o   If the UE is configured with transmission mode 9, and the *supportedMIMO-CapabilityDL-r10* field is included in the *UE-EUTRA-Capability*, the maximum number of layers is determined according to the minimum of the configured number of CSI-RS ports and the maximum of the reported UE downlink MIMO capabilities for the same band in the corresponding band combination. <br>       o   If the UE is configured with transmission mode 9, and the *supportedMIMO-CapabilityDL-r10* field is not included in the *UE-EUTRA-Capability*, the maximum number of layers is determined according to the minimum of the configured number of CSI-RS ports and *ue-Category*. <br>       o   Otherwise the maximum number of layers is determined according to the minimum of the number of PBCH antenna ports and *ue-Category*. |

FIG.19

For rank indication (RI) (RI only, joint report of RI and i1, and joint report of RI and PTI)

- The corresponding bit widths for RI feedback for PDSCH transmissions are given by Tables 5.2.2.6.1-2, 5.2.2.6.2-3, 5.2.2.6.3-3, 5.2.3.3.1-3, 5.2.3.3.1-3A, 5.2.3.3.2-4, and 5.2.3.3.2-4A, which are determined assuming the maximum number of layers as follows:

o   If the UE is configured with transmission mode 9, and the *supportedMIMO-CapabilityDL-r10* field is included in the *UE-EUTRA-Capability*, the maximum number of layers is determined according to the minimum of the configured number of CSI-RS ports and the maximum of the reported UE downlink MIMO capabilities for the same band in the corresponding band combination.

o   If the UE is configured with transmission mode 9, and the *supportedMIMO-CapabilityDL-r10* field is not included in the *UE-EUTRA-Capability*, the maximum number of layers is determined according to the minimum of the configured number of CSI-RS ports and *ue-Category* (without suffix).

o   If the UE is configured with transmission mode 9, and the *supportedMIMO-CapabilityDL-r12* field is included in the *UE-EUTRA-Capability*, the RI bit width for each component carrier in the intra-band contiguous band combination is determined according to the *ue-RI-Bit-Width-r12* value signalled to the UE.

o   If the UE is configured with transmission mode 10, and the *supportedMIMO-CapabilityDL-r10* field is included in the *UE-EUTRA-Capability*, the maximum number of layers for each CSI process is determined according to the minimum of the configured number of CSI-RS ports for that CSI process and the maximum of the reported UE downlink MIMO capabilities for the same band in the corresponding band combination.

o   If the UE is configured with transmission mode 10, and the *supportedMIMO-CapabilityDL-r10* field is not included in the *UE-EUTRA-Capability*, the maximum number of layers for each CSI process is determined according to the minimum of the configured number of CSI-RS ports for that CSI process and *ue-Category* (without suffix).

o   If the UE is configured with transmission mode 10, and the *supportedMIMO-CapabilityDL-r12* field is included in the *UE-EUTRA-Capability*, the RI bit width for each CSI process for each component carrier in the intra-band contiguous band combination is determined according to the *ue-RI-Bit-Width-r12* value signalled to the UE.

o   Otherwise the maximum number of layers is determined according to the minimum of the number of PBCH antenna ports and *ue-Category* (without suffix).

FIG.20A

| CQI-ReportConfig information elements |
|---|

```
-- ASN1START

CQI-ReportConfig ::=            SEQUENCE {
```

```
    cqi-ReportBoth-v1250            CQI-ReportBoth-v1250        OPTIONAL,    -- Need ON
    cqi-ReportAperiodic-v1250   CQI-ReportAperiodic-v1250   OPTIONAL,    -- Need ON
    altCQI-Table-r12                ENUMERATED {
                                    allSubframes, csi-SubframeSet1,
                                    csi-SubframeSet2, spare1)   OPTIONAL     -- Need OP
}

CQI-ReportConfig-v12xy ::=  SEQUENCE {
    cqi-ReportBoth-v12xy            CQI-ReportBoth-v12xy
}

CQI-ReportConfigSCell-r10 ::=       SEQUENCE {
    cqi-ReportModeAperiodic-r10     CQI-ReportModeAperiodic OPTIONAL,       -- Need OR
    nomPDSCH-RS-EPRE-Offset-r10         INTEGER (-1..6),
    cqi-ReportPeriodicSCell-r10     CQI-ReportPeriodic-r10      OPTIONAL,   -- Need ON
    pmi-RI-Report-r10               ENUMERATED {setup}          OPTIONAL    -- Cond
PMIRISCell
}
```

```
CQI-ReportBoth-v1250 ::=            SEQUENCE {
    csi-IM-ConfigToReleaseListExt-r12       CSI-IM-ConfigId-v1250   OPTIONAL,    -- Need ON
    csi-IM-ConfigToAddModListExt-r12        CSI-IM-ConfigExt-r12    OPTIONAL     -- Need ON
}

CQI-ReportBoth-v1250 ::=            SEQUENCE {
    ue-RI-bitwidth-r12              ENUMERATED {b1, b2, b3}
}

CSI-IM-ConfigToAddModList-r11 ::=   SEQUENCE (SIZE (1..maxCSI-IM-r11)) OF CSI-IM-Config-r11

CSI-IM-ConfigToReleaseList-r11 ::=  SEQUENCE (SIZE (1..maxCSI-IM-r11)) OF CSI-IM-ConfigId-r11

CSI-ProcessToAddModList-r11 ::=     SEQUENCE (SIZE (1..maxCSI-Proc-r11)) OF CSI-Process-r11

CSI-ProcessToReleaseList-r11 ::=    SEQUENCE (SIZE (1..maxCSI-Proc-r11)) OF CSI-ProcessId-r11

CQI-ReportBothProc-r11 ::=          SEQUENCE {
    ri-Ref-CSI-ProcessId-r11            CSI-ProcessId-r11       OPTIONAL,    -- Need OR
    pmi-RI-Report-r11                   ENUMERATED {setup}      OPTIONAL     -- Need OR
}

-- ASN1STOP
```

FIG.20B

| CQI-ReportConfig field descriptions |
|---|
| *ue-RI-bitwidth* <br> Indicates the RI bitwidth as specified in TS 36.212. Value b1 denotes 1 bit and b2 denotes 2 bits and so on. |

USER APPARATUS, BASE STATION AND INFORMATION RECEPTION METHOD

TECHNICAL FIELD

The present invention relates to a technique for a user apparatus UE in a mobile communication system such as LTE to transmit uplink control information to a base station eNB.

BACKGROUND ART

In LTE-Advanced, carrier aggregation (CA: Carrier Aggregation) in which communication is performed by using a plurality of carriers simultaneously is adopted. In carrier aggregation, a carrier which is a basic unit is called a component carrier (CC: Component Carrier).

The carrier aggregation is classified to three scenarios as shown in FIGS. 1A-1C depending on frequency placement of CCs. FIG. 1A shows Intra-band contiguous CA, which is a scenario for arranging contiguous CCs within a band. This scenario is applied, for example, to a case where assignment of wideband such as 3.5 GHz band is performed. FIG. 1B shows Inter-band non-contiguous CA, which is a scenario in which a plurality of CCs of different bands are arranged. This scenario is applied, for example, to a case where communication is performed using a plurality of carriers of 2 GHz band and 1.5 GHz band and the like. FIG. 1C shows Intra-band non-contiguous CA, which is a scenario in which non-contiguous CCs are arranged in a same band. This scenario is applied, for example, to a case where assignment of frequency bands to carriers is fragmentary.

In addition, in the LTE (including LTE-Advanced) system, it is specified that, when connecting to a network and the like, for example, the user apparatus UE transmits the own capability to the base station eNB by a predetermined signaling message (UE-EUTRA-Capability) (non-patent document 1, for example).

In the notification of the capability information, the user apparatus UE notifies the base station eNB of a combination (CA band combination) of bands that the user apparatus UE supports. Also, when the user apparatus UE can support a plurality of kinds of CA band combinations, the user apparatus UE notifies the base station eNB of all of supported CA band combination patterns.

A structure example of the message for notifying of CA band combinations is shown in FIG. 2. As shown in FIG. 2, by the message, it is possible to transmit CA bandwidthclass and the number of MIMO layers for each band combination, for each band, for UL/DL. Though not shown in FIG. 2, as for DL, it is possible to transmit the number of CSI (Channel State Information) processes (supportedCSI-Pro) that the UE can set for each band combination for each band. Note that the number of CSI processes is the number of CSI processes that the user apparatus UE uses when CoMP (Coordinated Multi-Point transmission/reception) is applied.

The CA bandwidthclass (CA bandwidth class) shown in FIG. 2 is a class defined by a table (non-patent document 2) shown in FIG. 3, for example, and indicates a bandwidth, the number of CCs and the like that the user apparatus can aggregate for each frequency band.

As described above, the user apparatus UE can notify the base station eNB of the number of MIMO layers that the user apparatus UE supports as capability information. Here, the number of MIMO layers of the user apparatus UE is configured for each CC in each of UL and DL.

In addition, capability of the number of MIMO layers in the user apparatus UE is notified to the base station eNB for each band. For example, as for the case of Inter-band CA of FIG. 4A, the number "2" of DL MIMO layers is notified in band 19 (class A), and the number "4" of DL MIMO layers is notified in band 1 (class A). Also, in the case of Intra-band non-contiguous CA of FIG. 4B, the number "2" of DL MIMO layers is notified by notification of one band 3 (class A), and the number "4" of DL MIMO layers is notified by notification of another band 3 (class A). Also, in the case of Intra-band contiguous CA of FIG. 4C, the number "4" of DL MIMO layers is notified in band 42 (class C). Though FIGS. 4A-4C show the number of DL MIMO layers, same applies to the number of UL MIMO layers, and the number of CSI processes.

As described above, in the cases of Inter-band CA and Intra-band non-contiguous CA, since the class is A, one band is mapped to one CC. Therefore, by notifying of capability of the number of MIMO layers, capability of the number of MIMO layers can be notified for each CC.

However, in the case of Intra-band contiguous CA, a plurality of CCs are used in one band. However, only one number of MIMO layers for the one band can be notified. Therefore, the one number of the MIMO layers is interpreted as capability corresponding to each CC that forms Intra-band contiguous CA.

RELATED ART DOCUMENT

Non Patent Document

[NON PATENT DOCUMENT 1] 3GPP TS 36.331 V12.5.0 (2015-03)
[NON PATENT DOCUMENT 2] 3GPP TS 36.101 V12.7.0 (2015-03)
[NON PATENT DOCUMENT 3] 3GPP R2-152921
[NON PATENT DOCUMENT 4] 3GPP TS 36.212 V12.4.0 (2015-03)

SUMMARY OF THE INVENTION

Problem to be Solved by the Invention

For the problem that a capability value cannot be notified for each CC by the capability information notification of Intra-band contiguous CA, it is proposed, in non-patent document 3, to additionally perform signaling of the number of MIMO layers and the like for each CC of Intra-band contiguous CA. More specifically, "intraBandContiguousCC-InfoList-r12" is added so as to make it possible to notify of the number of MIMO layers for the number of CCs that form the CA of the band combination. Note that the "the number of MIMO layers" is the maximum number of MIMO layers that the UE can support. Same applies hereafter.

In the above-mentioned notification method, for example, as shown in FIG. 5, for Intra-band contiguous CA of DL 42C, the minimum value of 2 in 2 CCs is notified by using a conventional field (supportedMIMO-CapabilityDL-r10). Also, {4, 2} is notified as the numbers of MIMO layers for the number of CCs by using a newly introduced field (supportedMIMO-CapabilityDL-r12). Note that {4, 2} means that the number of DL MIMO layers for a CC of 2 CCs is 4, and that the number of DL MIMO layers for another CC is 2, however, which CC is 4 and which CC is 2 are not distinguished.

Also, notifying of the minimum of 2 in the numbers of MIMO layers of the 2 CCs by using the conventional field (supportedMIMO-CapabilityDL-r10) means to notify of the maximum value of the numbers of layers that every CC of the 2CCs can support. That is, in the Intra-band contiguous CA, in the conventional field (supportedMIMO-CapabilityDL-r10), it is agreed to notify of the maximum value of the number of layers that every CC included in the band can support.

Here, as described in the non-patent document 3, in the conventional technique, it is specified to determine a bit width (which may be also referred to as the number of bits) of RI (Rank Indicator), that is one of pieces of channel state information (CSI) transmitted to the base station eNB by the user apparatus UE, based on the number of DL MIMO layers notified by the field of "supportedMIMO-CapabilityDL-r10". More specifically, the non-patent document 3 (excerpt) includes a description of "The corresponding bit widths for RI feedback for PDSCH transmissions are given by Tables 5.2.2.6.1-2, 5.2.2.6.2-3, 5.2.2.6.3-3, 5.2.3.3.1-3, 5.2.3.3.1-3A, 5.2.3.3.2-4, and 5.2.3.3.2-4A, which are determined assuming the maximum number of layers as follows: If the UE is configured with transmission mode 9, and the supportedMIMO-CapabilityDL-r10 field is included in the UE-EUTRA-Capability, the maximum number of layers is determined according to the minimum of the configured number of CSI-RS ports and the maximum of the reported UE downlink MIMO capabilities for the same band in the corresponding band combination."

That is, in the case where the user apparatus UE is configured with a transmission mode for performing RI transmission, the user apparatus UE determines, in the band, the maximum number of layers based on the minimum value of the maximum number of DL MIMO layers transmitted by "supportedMIMO-CapabilityDL-r10" and the configured number of antenna ports (the number of CSI-RS ports) so as to determine a bit width of RI from a table of 5.2.2.6.1-2 and the like based on the maximum number of layers. The bit width of RI is determined for each CC.

FIG. 6 shows, as an example, the table 5.2.2.6.1-2. Based on the table, for example, when the number of DL MIMO layers is 2, the RI bit width becomes 1, and when the number of DL MIMO layers is 4, the RI bit width becomes 2.

For example, in the example of FIG. 5, the number of DL MIMO layers that the user apparatus UE notifies of by "supportedMIMO-CapabilityDL-r10" is 2. If the user apparatus UE is configured with 4 as the number of antenna ports, the RI bit width of each CC becomes 1 from the table of FIG. 6.

However, when the RI bit width is 1, only 1 or 2 can be notified as RI (rank). Therefore, there is a problem in that, even if the user apparatus UE has a capability of 4 layer spatial multiplexing by one CC of 2 CCs, the user apparatus cannot execute the 4 layer spatial multiplexing since RI=4 cannot be notified.

The above-mentioned problem occurs not only for RI but also for other uplink control information (UCI).

The present invention is contrived in view of the above-mentioned point, and an object of the present invention is to provide a technique to enable a user apparatus to properly determine a bit width of uplink control information in a mobile communication system that performs carrier aggregation.

Means for Solving the Problem

According to an embodiment of the present invention, there is provided a user apparatus configured to perform communication with a base station in a mobile communication system that supports carrier aggregation, including:
transmission means configured to transmit, to the base station, the numbers of layers for the number of component carriers that form the carrier aggregation as information of downlink MIMO capability; and
determination means configured to determine a bit width for transmitting uplink control information based on the maximum number of layers of the numbers of layers for the number of component carriers transmitted by the transmission means.

Also, according to an embodiment of the present invention, there is provided a user apparatus configured to perform communication with a base station in a mobile communication system that supports carrier aggregation, including:
transmission means configured to transmit, to the base station, the numbers of layers for the number of component carriers that form the carrier aggregation as information of downlink MIMO capability; and
reception means configured to receive, from the base station, the number of layers that is used for determining a bit width for transmitting uplink control information for each of the component carriers that form the carrier aggregation.

Also, according to an embodiment of the present invention, there is provided a user apparatus configured to perform communication with a base station in a mobile communication system that supports carrier aggregation, including:
transmission means configured to transmit, to the base station, the numbers of layers for the number of component carriers that form the carrier aggregation as information of downlink MIMO capability; and
reception means configured to receive, from the base station, a bit width for transmitting uplink control information for each of the component carriers that form the carrier aggregation.

Also, according to an embodiment of the present invention, there is provided a base station that is configured to perform communication with a user apparatus in a mobile communication system that supports carrier aggregation, including:
reception means configured to receive, from the user apparatus, the numbers of layers for the numbers of component carriers that form the carrier aggregation as information of downlink MIMO capability; and
transmission means configured to transmit, to the user apparatus, the number of layers that is used for determining a bit width for transmitting uplink control information for each of the component carriers that form the carrier aggregation.

Also, according to an embodiment of the present invention, there is provided a base station that is configured to perform communication with a user apparatus in a mobile communication system that supports carrier aggregation, including:
reception means configured to receive, from the user apparatus, the numbers of layers for the numbers of component carriers that form the carrier aggregation as information of downlink MIMO capability; and
transmission means configured to transmit, to the user apparatus, a bit width for transmitting uplink control information for each of the component carriers that form the carrier aggregation.

According to an embodiment of the present invention, there is provided an uplink control information bit width determination method executed by a user apparatus configured to perform communication with a base station in a mobile communication system that supports carrier aggregation, including:
- a transmission step of transmitting, to the base station, the numbers of layers for the number of component carriers that form the carrier aggregation as information of downlink MIMO capability; and
- a determination step of determining a bit width for transmitting uplink control information based on the maximum number of layers of the numbers of layers for the number of component carriers transmitted by the transmission step.

Also, according to an embodiment of the present invention, there is provided an information reception method executed by a user apparatus configured to perform communication with a base station in a mobile communication system that supports carrier aggregation, including:
- a transmission step of transmitting, to the base station, the numbers of layers for the number of component carriers that form the carrier aggregation as information of downlink MIMO capability; and
- a reception step of receiving, from the base station, the number of layers that is used for determining a bit width for transmitting uplink control information for each of the component carriers that form the carrier aggregation.

Also, according to an embodiment of the present invention, there is provided an information reception method executed by a user apparatus configured to perform communication with a base station in a mobile communication system that supports carrier aggregation, including:
- a transmission step of transmitting, to the base station, the numbers of layers for the number of component carriers that form the carrier aggregation as information of downlink MIMO capability; and
- a reception step of receiving, from the base station, a bit width for transmitting uplink control information for each of the component carriers that form the carrier aggregation.

Effect of the Present Invention

According to an embodiment of the present invention, it becomes possible that a user apparatus properly determines a bit width of uplink control information in a mobile communication system that performs carrier aggregation.

BRIEF DESCRIPTION OF THE DRAWINGS

FIG. 3 is a table showing CA-BandwidthClass;
FIG. 6 is a diagram showing an example of an RI bit width;
FIG. 9 is a diagram for explaining operation example 1 in RI bit width determination;
FIG. 10 is a diagram showing a change example of a standard specification in the operation example 1;
FIG. 11 is a diagram showing another example of a change example of a standard specification in the operation example 1;
FIG. 13 is a diagram showing a change example of a standard specification in the operation example 2;
FIG. 14 is a diagram showing a change example of a standard specification in the operation example 2;
FIG. 15A is a diagram showing a change example of a standard specification in the operation example 2;
FIG. 15B is a diagram showing a change example of a standard specification in the operation example 2;
FIG. 16A is a diagram showing another example of a change example of a standard specification in the operation example 2;
FIG. 16B is a diagram showing another example of a change example of a standard specification in the operation example 2;
FIG. 17 is a diagram showing another example of a change example of a standard specification in the operation example 2;
FIG. 18 is a diagram showing a change example of a standard specification in the operation example 3;
FIG. 19 is a diagram showing another example of a change example of a standard specification in the operation example 3;
FIG. 20A is a diagram showing another example of a change example of a standard specification in the operation example 3;
FIG. 20B is a diagram showing another example of a change example of a standard specification in the operation example 3.

EMBODIMENTS FOR CARRYING OUT THE INVENTION

In the following, an embodiment of the present invention is described with reference to figures. The embodiment described below is merely an example, and the embodiment to which the present invention is applied is not limited to the embodiment below. For example, although it is assumed that the communication system of the present embodiment supports LTE including LTE-Advanced, the present invention can be applied not only to LTE but also to other schemes performing CA.

Also, CA (carrier aggregation) in the present embodiment includes not only Intra-eNB CA but also Inter-eNB CA such as DC (Dual connectivity). In the present embodiment, "CC" and "cell" can be considered to be synonymous basically, so that "CC" may be called "cell" (serving cell, more specifically).

(System Whole Configuration, Operation Outline)

Figure 7:
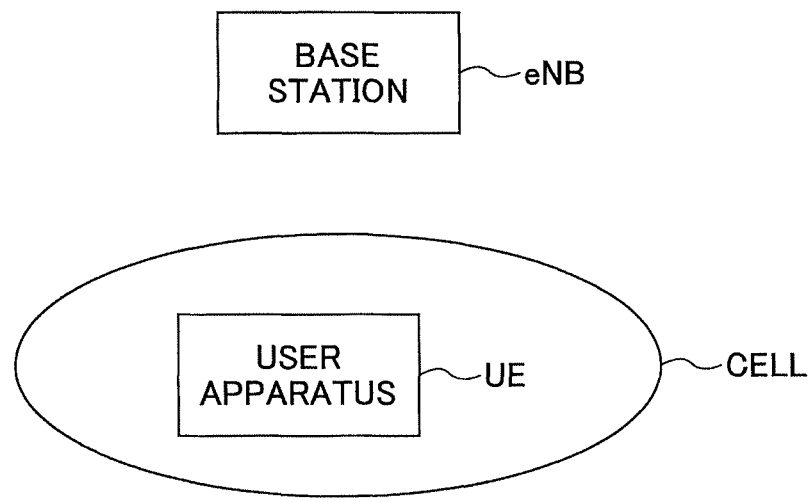
FIG. 7 is a block diagram of a communication system in an embodiment of the present invention.

FIG. 7 shows a block diagram of a communication system in an embodiment of the present invention. The communication system of the present embodiment is a communication system of the LTE scheme, and includes a user apparatus UE and a base station eNB as shown in FIG. 7. The user apparatus UE and the base station eNB can perform CA. The base station eNB can form a plurality of cells by itself, and also can form a plurality of cells, by remotely connecting an RRE (remote radio equipment) for example, by the main body of the base station eNB and the RRE. Although FIG. 7 shows one user apparatus UE and one base station eNB, this is an example, and a plurality of user apparatuses UE and a plurality of base stations eNB may be provided. Also, the user apparatus UE may be provided with capability (Dual connectivity) for performing communication with a plurality of base stations eNB simultaneously.

When CA is performed, a PCell (Primary cell) that is a reliable cell for ensuring connectivity and an SCell (Secondary cell) that is an appendant cell are set for the user apparatus UE. The user apparatus UE connects to a PCell first, and then, an SCell can be added as necessary. The PCell is a cell similar to an independent cell for supporting RLM (Radio Link Monitoring) and SPS (Semi-Persistent Scheduling) and the like. Addition and deletion of the SCell is performed by RRC (Radio Resource Control) signaling. Since an SCell is in a deactivated state right after it is set in the user apparatus UE, communication becomes available (scheduling becomes available) only by activating it.

When performing Dual connectivity, the user apparatus UE performs communication simultaneously using radio resources of two physically different base stations eNB. Dual connectivity is a kind of CA, and it is also referred to as Inter eNB CA (inter base station carrier aggregation), in which Master-eNB (MeNB) and Secondary-eNB (SeNB) are introduced. In DC, a cell group formed by cell(s) (one or a plurality of cells) under an MeNB is called MCG (Master Cell Group), and a cell group formed by cell(s) (one or a plurality of cells) under an SeNB is called SCG (Secondary Cell Group). An UL CC is set in at least one SCell in an SCG, and PUCCH is set in one of the SCells. The one SCell is called PSCell (primary SCell).

Figure 8:
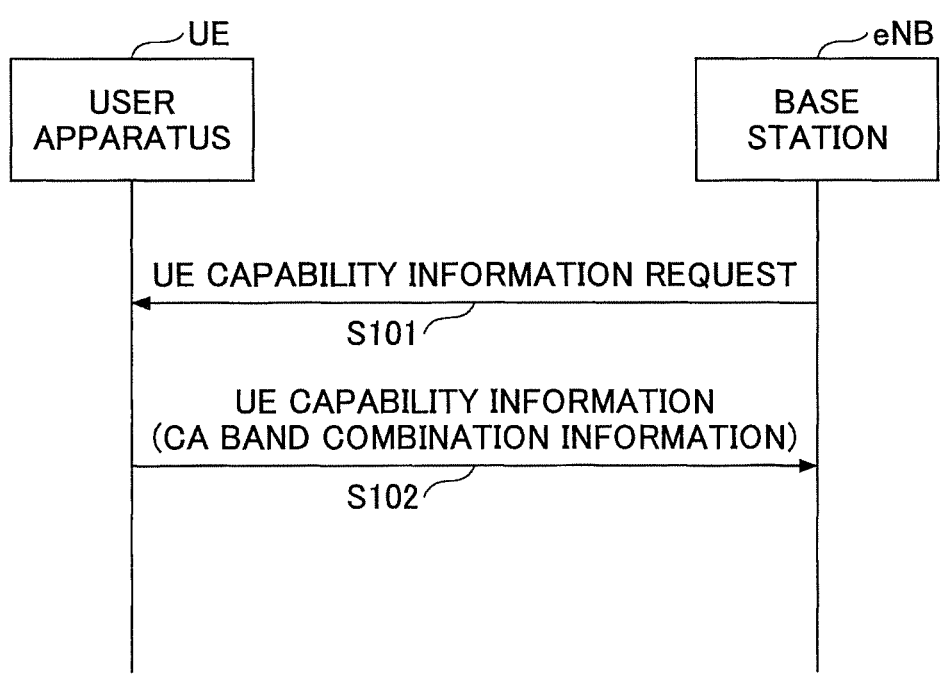
FIG. 8 is a sequence diagram showing operation of the communication system in the embodiment of the present invention.

As a basic operation in the present embodiment, there is notification of UE capability information. A notification operation example of UE capability operation is described with reference to FIG. 8. As shown in FIG. 8, in step S101, the user apparatus UE receives a UE capability information request (example: UE capability enquiry) transmitted from the base station eNB. The user apparatus UE transmits UE capability information to the base station eNB based on the UE capability information request (step S102). The UE capability information includes CA band combination information.

Note that the notification method shown in FIG. 8 is an example. For example, the user apparatus UE may transmit UE capability information to the base station eNB without receiving UE capability information request from the base station eNB.

Also, as a basic operation of the user apparatus UE, there is transmission of uplink control information (to be referred to as UCI hereinafter). As UCI, there are ACK/NACK (hybrid ARQ transmittal confirmation), scheduling request, and channel state information (to be referred to as CSI) and the like. The present embodiment especially focuses on transmission of an RI in the CSI. However, the technique of the present embodiment can be applied to UCI other than the RI.

As CSI reporting, there are periodic reporting and aperiodic reporting. For the periodic reporting, a PUCCH is normally used. But, when there is data transmission by a PUSCH at a periodic reporting timing, there is a case where the PUSCH is used. Also, aperiodic reporting is performed by a PUSCH based on a request in a scheduling grant from the base station eNB.

Also, the target for CSI reporting is for each downlink CC (cell). For example, in downlink CA including downlink CC1 and downlink CC2, the user apparatus UE obtains RI1 by measuring a CSI-RS received by the downlink CC1, reports the RI1 as an RI for the downlink CC1 to the base station eNB, and obtains RI2 by measuring a CSI-RS received by the downlink CC2, reports the RI2 as an RI for the downlink CC2 to the base station eNB.

In the following, in the present embodiment, an operation example 1 and an operation example 2 for solving the before-mentioned problem are described.

Operation Example 1

As described before, if the user apparatus UE determines a bit width of RI based on the number of DL MIMO layers notified by "supportedMIMO-CapabilityDL-r10" when the user apparatus UE is configured with "Intra-band contiguous CA", and further configured with a transmission mode for performing RI reporting, there occurs a case where the user apparatus UE cannot report a value of RI according to the capability of the user apparatus UE.

Therefore, in the operation example 1, the user apparatus UE determines an RI bit width based on the minimum value between the maximum number of DL MIMO layers in "supportedMIMO-CapabilityDL-r12"s for CCs notified by "intraBandContiguousCC-Info-r12" described in the non-patent document 3 and the number of configured CSI-RS ports.

Figure 1A:
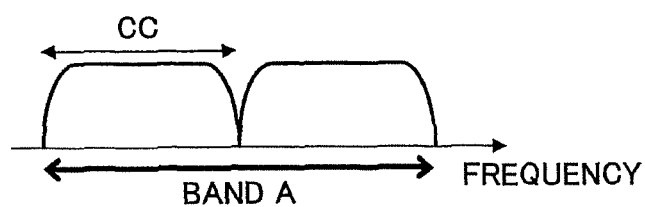
FIG. 1A is a diagram showing frequency arrangement example of carrier aggregation.
Figure 1B:
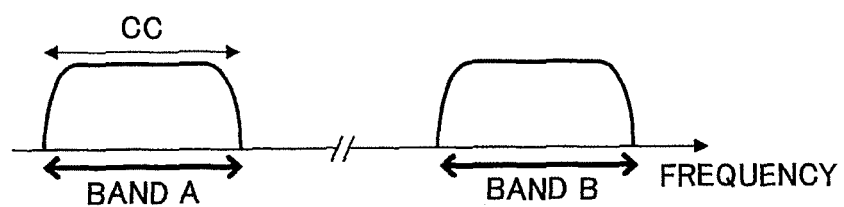
FIG. 1B is a diagram showing frequency arrangement example of carrier aggregation.
Figure 1C:
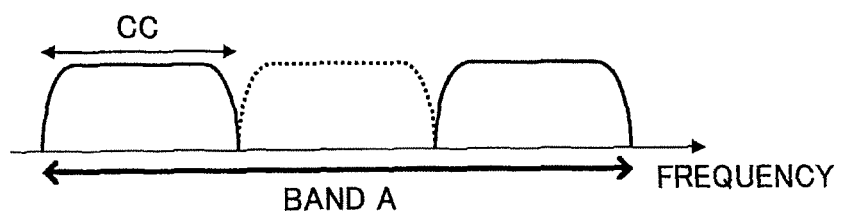
FIG. 1C is a diagram showing frequency arrangement example of carrier aggregation.
Figure 2:
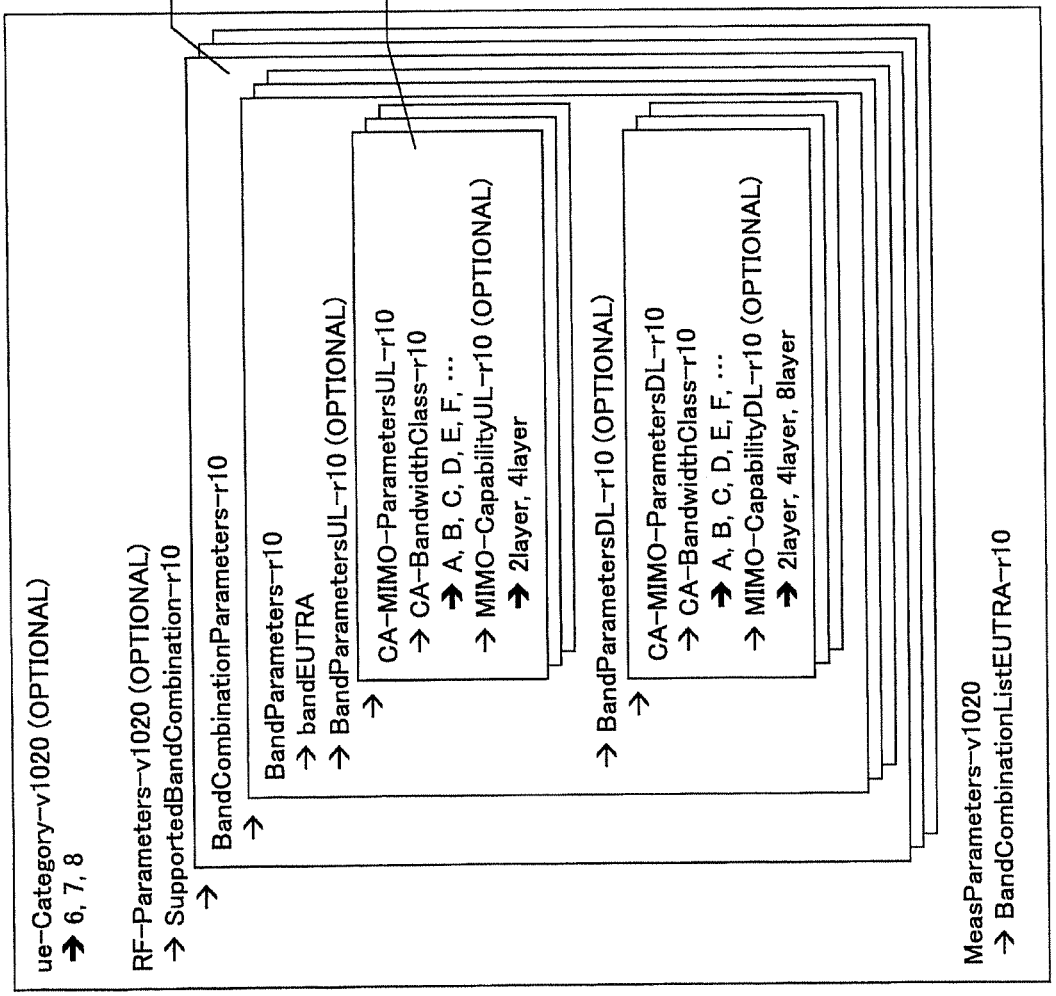
FIG. 2 is a diagram showing a structure example of a message for notifying of CA band combination information.
Figure 4A:
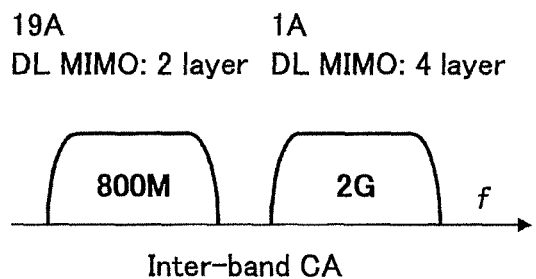
FIG. 4A is a diagram for explaining capability of notification of the number of MIMO layers.
Figure 4B:
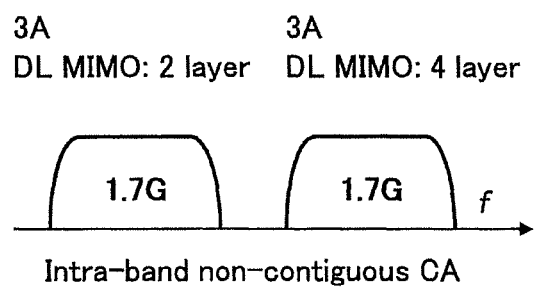
FIG. 4B is a diagram for explaining capability of notification of the number of MIMO layers.
Figure 4C:
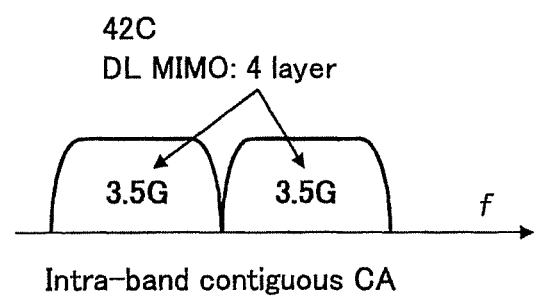
FIG. 4C is a diagram for explaining capability of notification of the number of MIMO layers.
Figure 5:
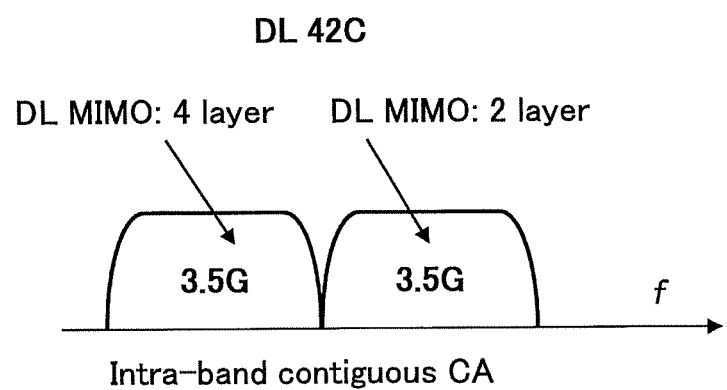
FIG. 5 is a diagram showing an example for performing notification of the number of MIMO layers for 2 CCs.

For example, in the example of FIG. 5 which shows intra-Band Contiguous CA of 2 CCs, the numbers of DL MIMO layers for 2 CCs are notified as {4, 2}. Thus, the maximum number of DL MIMO layers of this case is 4. Therefore, this 4 is used for determining a bit width of RI in each CC.

Also, in the UE, when the CA shown in FIG. 5 is configured, one or a plurality of numbers (example: 1, 2, 4, 8) of antenna ports are configured by "antennaPortsCount-r10" of an RRC message (CSI-RS-Config) received from the base station eNB for each CC (each cell).

In the example of FIG. 5, assuming that the configured number of CSI-RS ports is 4 for each CC, in a situation using the table shown in FIG. 6, the bit width of RI for each CC is determined as 2. Therefore, in the operation example 1, the user apparatus UE can notify the base station eNB of RI=4.

A procedure until RI transmission in the operation example 1 is described with reference to FIG. 9. Here, it is assumed that the user apparatus UE performs intra-band contiguous CA shown in FIG. 5. Also, it is assumed that, for each CC, the configured value of the number of CSI-RS ports is 4.

The user apparatus UE connected to the base station eNB notifies the base station eNB of {4, 2} as the number of MIMO layers for 2 CCs in step S201.

In step S202, the user apparatus UE determines an RI bit width for each CC from the table shown in FIG. 6, for example, by using "4" which is the maximum value of {4, 2} notified in step S201 and "4" which is a configured value of the number of CSI-RS ports. In step S203, the user apparatus UE reports, to the base station eNB, an RI by bits of the RI bit width determined in step S202.

FIG. 10 is a diagram showing a change example (excerpt) of the standard specification in the operation example 1. FIG. 10 shows changes of the non-patent document 4 (3GPP TS 36.212). Parts on changes are underlined. Also, the change example presupposes specification change described in the non-patent document 3 (R2-152921).

In FIG. 10, as described as "If the UE is configured with transmission mode 9, and the supportedMIMO-CapabilityDL-r12 field is included in the UE-EUTRA-Capability, the maximum number of layers is determined according to the minimum of the configured number of CSI-RS ports and the maximum of the reported UE downlink MIMO capabilities among the supportedMIMO-CapabilityDL-r12 fields in the intraBandContiguousCC-Info-r12 field for the corresponding bandwidth class in the corresponding band combination.", in the operation example 1, "the number of layers" (maximum number of layers) used for determining an RI bit width of each CC in intraband contiguous band combination is determined based on the configured value of the number of CSI-RS ports and the maximum value of "supportedMIMO-CapabilityDL-r12"s of CCs in "intraBandContiguousCC-Info-r12" field.

FIG. 11 shows another specification change example. As for the above-mentioned contents, the specification change example shown in FIG. 11 is substantially the same as the specification change example shown in FIG. 10.

Operation Example 2

Next, the operation example 2 in the present embodiment is described.

In the notification scheme of the number of DL MIMO layers for the number of CCs in Intra-band contiguous CA proposed in the non-patent document 3, for example, {4, 2} is notified from the user apparatus UE to the base station eNB as the number of MIMO layers for 2 CCs (it is assumed that these are CC1 and CC2 here). Note that, in this notification scheme, the above-mentioned notification content corresponds to all patterns of {CC1, CC2}={4, 2}, {2, 4}, and {2, 2}. That is, in this case, there is a possibility in that the base station eNB configures the user apparatus UE with any of {CC1, CC2}={4, 2}, {2, 4}, and {2, 2}. Therefore, it is assumed that the user apparatus UE has capability supporting any of {CC1, CC2}={4, 2}, {2, 4}, and {2, 2}.

Here, in the above-mentioned configuration example, in the operation example 1, 4 is used as the number of DL MIMO layers for determining an RI bit width for any of CC1 and CC2, so that an RI bit width that can notify of 4 layers is determined as an RI bit width for any of CC1 and CC2. However, in the case of {4, 2}, since one of CC1 and CC2 only supports 2 layers, useless bits occur if an bit width that can notify of 4 layers is determined for a CC that supports only 2 layers.

Thus, in the operation example 2, the number of DL MIMO layers is notified from the base station eNB to the user apparatus UE for each cell (CC) by using an RRC message such that the user apparatus UE can determine an RI bit width suitable for capability of each CC.

A process procedure example in the operation example 2 is described with reference to FIG. 12. Also in the example of FIG. 12, it is assumed that, in intra-band contiguous CA of DL42C, the number of DL MIMO layers of one CC (which is CC1) is 4, and that the number of DL MIMO layers of another CC (which is CC1) is 2.

In step S301, according to the specification described in the non-patent document 3, the user apparatus UE notifies the base station eNB of the number of DL MIMO layers. That is, in step S301, 42C is notified as Band combination, and {4, 2} is notified as a list "IntraBandContiguousCC-InfoList-r12" of "supportedMIMO-CapabilityDL-r12".

The base station eNB that receives "IntraBandContiguousCC-InfoList-r12" notifies the user apparatus UE of the number of DL MIMO layers for each CC by an RRCConnectionReconfiguration message in step S302. For example, information is notified indicating that the number of DL MIMO layers of CC1 is 4, and that the number of DL MIMO layers of CC2 is 2.

Note that, configuration of intra-band contiguous CA may be performed by the RRCConnectionReconfiguration message of step S302, or, configuration of intra-band contiguous CA may be performed before step S302 or after step S302.

After the user apparatus UE sets (stores) information received in step S302, the user apparatus UE transmits "RRCConnectionReconfigurationComplete" to the base station eNB in step S303.

The base station eNB receives {4, 2} as the numbers of DL MIMO layers for 2 CCs in step S301, so that the base station eNB ascertains that the number of DL MIMO layers of one of CC1 and CC2 is 4, and that the number of DL MIMO layers of another one is 2 to determine which CC to use 4 as the number of DL MIMO layers and which CC to use 2 as the number of DL MIMO layers. The method for the determination is not limited to a specific method, but, for example, it can be determined by quality of CCs reported from the user apparatus UE. Also, a determination method may be adopted in which, the number of DL MIMO layers of a CC of a PCell is determined as a greater one (or smaller one) and the number of DL MIMO layers of a CC of an SCell is determined as a smaller one (or greater one)

In step S302, more specifically, when notifying of the number of DL MIMO layers (the maximum number of MIMO layers) of a CC of the PCell, the number of DL MIMO layers for obtaining an RI bit width is notified by "maxLayers-PMI-RI-report-r12 IE" in "cqi-ReportBoth-v12xy" of "cqi-ReportConfigPCell-v12xy" that is newly added to "physicalConfigDedicated IE" in "radioResourceConfigDedicated IE" included in "RRCConnectionReconfiguration".

When notifying of the number of DL MIMO layers of a CC of the SCell, the number of DL MIMO layers for obtaining an RI bit width is notified by "maxLayers-PMI-RI-report-r12 IE" in "cqi-ReportBoth-v12xy" of "cqi-ReportConfigSCell-v12xy" that is newly added to "physicalConfigDedicatedSCell IE" in "radioResourceConfigDedicated IE" included in "RRCConnectionReconfiguration".

FIGS. 13-15A, B are diagrams showing change examples (excerpt) of the standard specification in the operation example 2. FIG. 13 shows changes of excerpt of the non-patent document 4 (3GPP TS 36.212). Parts on changes are underlined. Also, the change example presupposes specification change described in the non-patent document 3 (R2-152921).

In FIG. 13, as described as "If the UE is configured with transmission mode 9, and the supportedMIMO-CapabilityDL-r12 field is included in the UE-EUTRA-Capability, the maximum number of layers for each component carrier in the intra-band contiguous band combination is configured by higher layers." in FIG. 13, in the operation example 2, the "number of layers" (maximum number of layers) used for RI bit width determination is configured by higher layer for each CC in "intra-band contiguous band combination". More specifically, to be configured by higher layer means operation of step S302 in the sequence of FIG. 12.

FIG. 14 shows a change example in "PhysicalConfigDedicated information element" in the non-patent document 1 (3GPP TS 36.331). The above-mentioned "cqi-ReportConfigPCell-v12xy" and "cqi-ReportConfigSCell-v12xy" are added.

FIG. 15A shows a change example in "CQI-ReportConfig information elements" in the non-patent document 1 (3GPP TS 36.331). The above-mentioned "maxLayers-PMI-RI-report-r12 IE" and the like are added. FIG. 15B shows description of "maxLayers-PMI-RI-report". As shown in FIG. 15B, "maxLayers-PMI-RI-report" indicates the maximum number of layers for determining an RI bit width.

FIGS. 16A and 16B show examples different from examples shown in FIGS. 15A and 15B as for changes in "CQI-ReportConfig information elements". In this example, "maxLayers-RI-report" is used instead of "maxLayers-PMI-RI-report". But, substantial content is the same as the examples of FIGS. 15A and 15B.

FIG. 17 shows an example different from the example shown in FIG. 13 as for changes in the non-patent document 4 (3GPP TS 36.212). In the example of FIG. 17, as described as "If the UE is configured with transmission mode 9, and the supportedMIMO-CapabilityDL-r12 field is included in the UE-EUTRA-Capability, the maximum number of layers for each component carrier in the intra-band contiguous band combination is determined according to the minimum of the configured number of CSI-RS ports and the configured number of maximum layers indicated by the maxLayers-RI-report-r12 field to the UE.", "the number of layers" (maximum number of layers) of each CC used for determining an RI bit width is determined according to the configured value of the configured number of CSI-RS ports and the number of layers indicated by the "maxLayers-RI-report-r12" field. This content is substantially the same as the content of the operation example 2 described so far.

Operation Example 3

In the operation example 2, the number of DL MIMO layers for determining an RI bit width is notified from the base station eNB to the user apparatus UE for each cell (CC) by using an RRC message. In addition to that, the RI bit width itself may be notified from the base station eNB to the user apparatus UE using an RRC message. This is described as the operation example 3.

Figure 12:
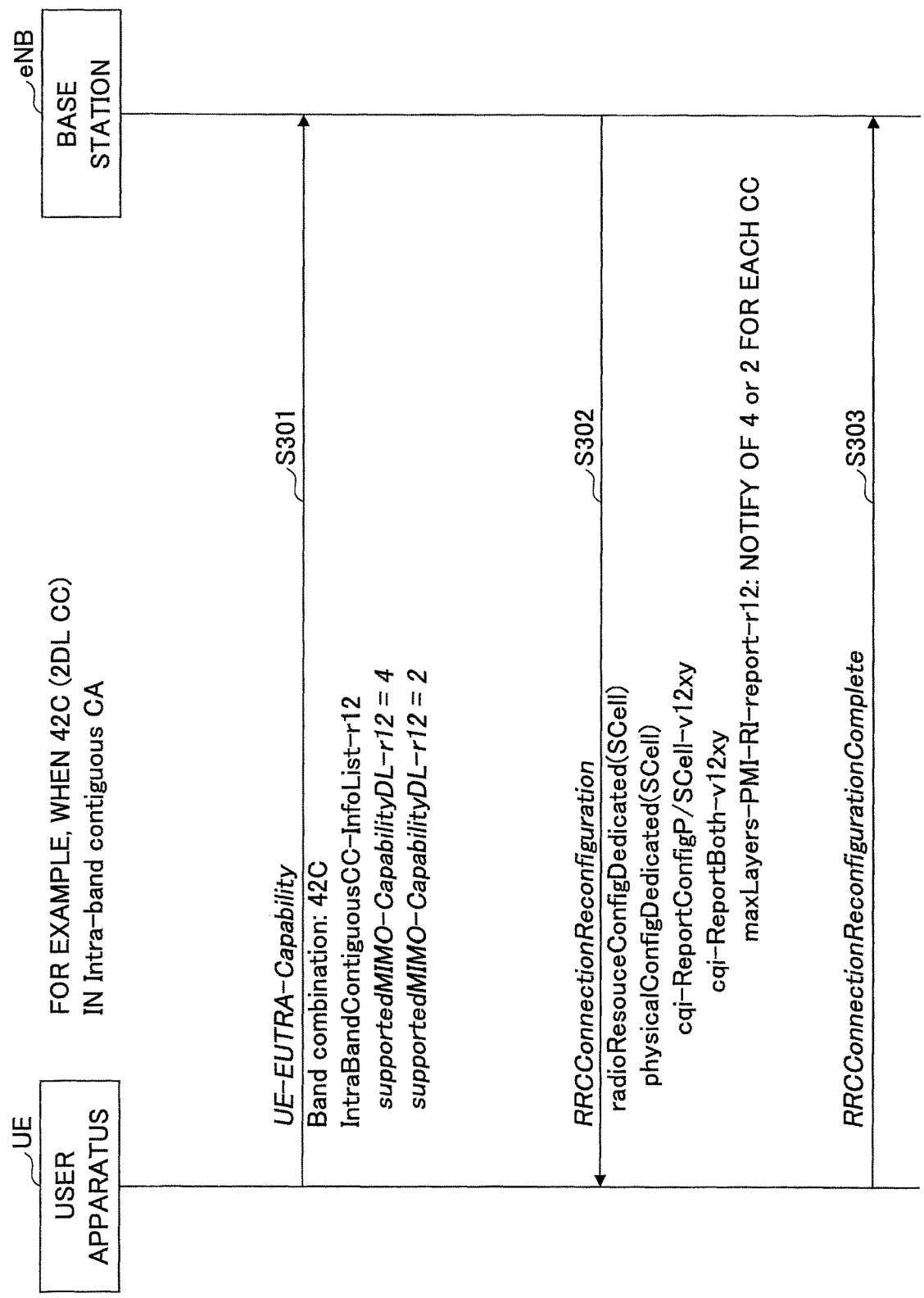
FIG. 12 is a sequence diagram for explaining operation example 2 in RI bit width determination.

The process procedure in the operation example 3 is a procedure in which a part of the process procedure shown in FIG. 12 is changed. Steps S301 and S303 of FIG. 12 are the same between the operation example 3 and the operation example 2.

On the other hand, in step S302, in the operation example 3, "ue-RI-bitwidth" (which may be described as "ue-RI-Bit-Width") is used, instead of "maxLayers-PMI-RI-report", to notify of an RI bit width for each CC from the base station eNB to the user apparatus UE. How the base station eNB determines the RI bit width is not specifically limited, but, for example, the RI bit width can be determined by a method similar to the method in which the user apparatus UE determines an RI bit width from the number of DL MIMO layers and the number of CSI-RS ports.

For example, in the example of FIG. 12, the base station eNB receives {4, 2} as the number of DL MIMO layers for 2 CCs in step S301, so that the base station eNB ascertains that the number of DL MIMO layers of one of CC1 and CC2 is 4, and that the number of DL MIMO layers of another one is 2, determines the number of DL MIMO layers of CC1 as 4, for example, to determine the RI bit width of CC1 as 2 based on this, and determines the number of DL MIMO layers of CC2 as 2 to determine the RI bit width of CC2 as 1 based on this. Then, in this case, in the operation example 3, in step S302 of FIG. 12, the base station eNB notifies the user apparatus UE of {RI bit width of CC1, RI bit width of CC2}={2, 1}.

The user apparatus UE that receives {RI bit width of CC1, RI bit width of CC2}={2, 1} performs transmission of RI by setting the RI bit width using the value of the received RI bit width.

FIG. 18 shows a change example from excerpt of the non-patent document 4 (3GPP TS 36.212) in the operation example 3.

In FIG. 18, as described as "If the UE is configured with transmission mode 9, and the supportedMIMO-CapabilityDL-r12 field is included in the UE-EUTRA-Capability, the RI bit width for each component carrier in the intra-band contiguous band combination is configured by higher layers.", in the operation example 3, the RI bit width is configured by higher layer for each CC in "intra-band contiguous band combination".

FIG. 19 shows another example of a change example from excerpt of the non-patent document 4 (3GPP TS 36.212) in the operation example 3. In the example of FIG. 19, as described as "If the UE is configured with transmission mode 9, and the supportedMIMO-CapabilityDL-r12 field is included in the UE-EUTRA-Capability, the RI bit width for each component carrier in the intra-band contiguous band combination is determined according to the ue-RI-Bit-Width-r12 value signaled to the UE.", the RI bit width is determined, for each CC in "intra-band contiguous band combination", by "ue-RI-Bit-Width" that is notified to UE. This content is substantially the same as the content of operation example 3 described so far.

As to the change in "PhysicalConfigDedicated information element" in the non-patent document 1 (3GPP TS 36.331), the operation example 3 is the same as the operation example 2, which is as shown in FIG. 14.

FIG. 20A shows a change example in "CQI-ReportConfig information elements" in the non-patent document 1 (3GPP TS 36.331). The above-mentioned "ue-RI-bitwidth" and the like are added. FIG. 20B is a description of "ue-RI-bitwidth". As shown in FIG. 20B, "ue-RI-bitwidth" indicates an RI bit width.

By executing processes like the operation examples 1, 2 and 3, even when the number of DL MIMO layers is different between CCs in Intra-band contiguous CA, the RI bit width can be configured without downgrade to the minimum value. Thus, the number of DL MIMO layers can be provided according to supported capability of the user apparatus UE.

(Apparatus Configuration Example, UE Operation Example)

Next, main configurations of the user apparatus UE and the base station eNB that can execute operation (including the operation example 1, the operation example 2, and the operation example 3) described so far are described.

Figure 21:
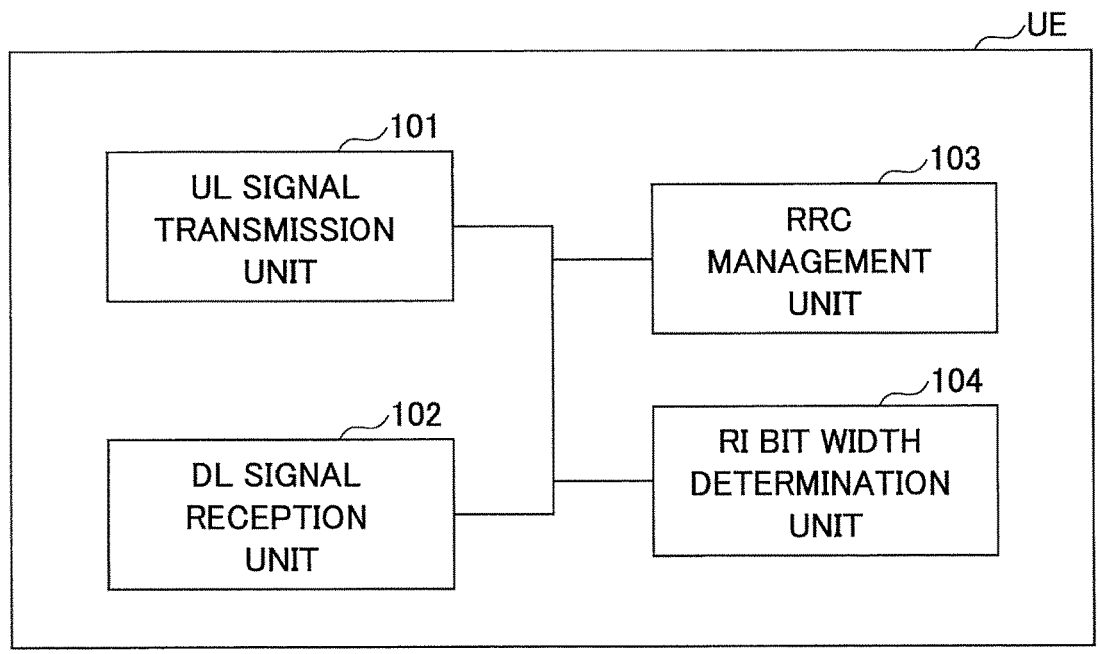
FIG. 21 is a block diagram of a user apparatus UE.

First, FIG. 21 shows a block diagram of the user apparatus UE according to the present embodiment. As shown in FIG. 21, the user apparatus UE includes an UL signal transmission unit 101, a DL signal reception unit 102, an RRC management unit 103, and an RI bit width determination unit 104. FIG. 21 only shows functional units especially related to the embodiment of the present invention in the user apparatus UE, and the user apparatus UE also includes at least functions, not shown in the figure, for performing operation complying with LTE. Also, the functional configuration shown in FIG. 21 is merely an example. Any functional segmentations and any names of functional units can be used as long as the user apparatus UE can execute operation described in the present embodiment. Also, the user apparatus UE may include functions for performing all operations of the operation examples 1, 2, and 3, or may include functions for performing any one or two operations of the operation examples 1, 2, and 3.

The UL signal transmission unit 101 includes functions configured to generate various signals of physical layer from an upper layer signal to be transmitted from the user apparatus UE, and transmit the signals by radio. The DL signal reception unit 102 includes functions configured to receive various signals from the base station eNB by radio and obtain a signal of an upper layer from the received physical layer signals. Each of the UL signal transmission unit 101 and the DL signal reception unit 102 includes a function configured to execute CA in which communication is performed by bundling a plurality of CCs. Also, the DL signal reception unit 102 includes a function configured to determine a CSI such as an RI by performing measurement of a reference signal, and the UL signal transmission unit 101 includes a function configured to transmit the CSI such as the RI.

It is assumed that each of the UL signal transmission unit 101 and the DL signal reception unit 102 includes a packet buffer, and performs processing of the layer 1 (PHY) and the layer 2 (MAC, RLC, PDCP). However, it is not limited to this.

The RRC management unit 103 includes functions configured to perform transmission and reception of an RRC message with the base station eNB via the UL signal transmission unit 101/DL signal reception unit 102, and to perform processing of setting/change/management of CA information, configuration change and the like. Also, the RRC management unit 103 holds information of capability of the user apparatus UE, and generates an RRC message for notification of capability information, and transmits it to the base station via the UL signal transmission unit 101.

When executing the operation example 1, the RI bit width determination unit 104 determines an RI bit width according to the method described in the changed non-patent document 4 (3GPP TS 36.212) shown in FIG. 10 or FIG. 11, for example. Also, when executing the operation example 2, the RI bit width determination unit 104 determines an RI bit width according to the method described in the changed non-patent document 4 (3GPP TS 36.212) shown in FIG. 13 or FIG. 17, for example. Also, when executing the operation example 3, the RI bit width determination unit 104 determines an RI bit width according to the method described in the changed non-patent document 4 (3GPP TS 36.212) shown in FIG. 18 or FIG. 19, for example. Note that, in the operation example 3, the RI bit width determination unit 104 obtains an RI bit width from a message received from the base station eNB to determine the RI bit width as a bit width for transmitting an RI. The RI bit width determination unit 104 may be provided in the UL signal transmission unit 101.

Figure 22:
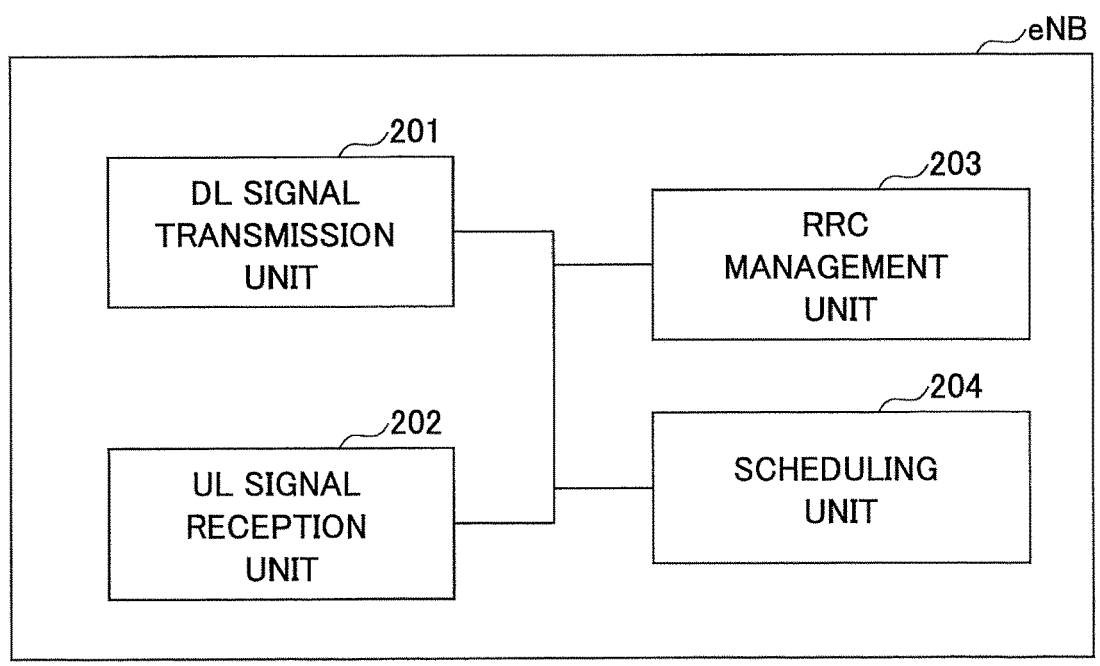
FIG. 22 is a block diagram of a base station eNB.

FIG. 22 shows a block diagram of the base station eNB according to the present embodiment. As shown in FIG. 22, the base station eNB includes a DL signal transmission unit 201, an UL signal reception unit 202, an RRC management unit 203, and a scheduling unit 204. FIG. 22 only shows main functional units especially related to the embodiment of the present invention in the base station eNB, and the base station eNB also includes at least functions, not shown in the figure, for performing operation complying with LTE. Also, the configuration shown in FIG. 22 is merely an example. Any functional segmentations and any names of functional units can be used as long as the base station eNB can execute operation described in the present embodiment. The base station eNB may be a single base station eNB, and also, the base station eNB may become either one of an MeNB and an SeNB by configuration when performing DC. Also, the base station eNB may include functions for performing all operations of the operation examples 1, 2, and 3, or may include functions for performing any one or two operations of the operation examples 1, 2, and 3.

The DL signal transmission unit 201 includes functions configured to generate various signals of physical layer from an upper layer signal to be transmitted from the base station eNB, and transmit the signals by radio. The UL signal reception unit 202 includes functions configured to receive various signals from each UE by radio and obtain a signal of an upper layer from the received physical layer signals. Each of the DL signal transmission unit 201 and the UL signal reception unit 202 includes a function configured to execute CA in which communication is performed by bundling a plurality of CCs. Also, each of the DL signal transmission unit 201 and the UL signal reception unit 202 may include a radio communication unit, such as an RRE, that is remotely placed from the main body (control unit) of the base station eNB.

It is assumed that each of the DL signal transmission unit 201 and the UL signal reception unit 202 includes a packet buffer, and performs processing of the layer 1 (PHY) and the layer 2 (MAC, RLC, PDCP). However, it is not limited to this.

The RRC management unit 203 includes functions configured to perform transmission and reception of an RRC message with the user apparatus UE via the DL signal transmission unit 201/UL signal reception unit 202, and to perform processing of setting/change/management of CA, configuration change and the like. Also, the RRC management unit 203 receives capability information from the user apparatus UE via the UL signal reception unit 202, and holds the capability information, so that the RRC management unit 203 can perform configuration and the like of CA for the user apparatus UE based on the capability information. Also, as described in the operation example 2, the RRC management unit 203 includes a function configured, when receiving the number of DL MIMO layers for a plurality of CCs in the "intra-band contiguous band combination", to notify the user apparatus UE of the number of DL MIMO layers for each CC. Also, as described in the operation example 3, the RRC management unit 203 may include a function configured, when receiving the number of DL MIMO layers for a plurality of CCs in the "intra-band contiguous band combination", to notify the user apparatus UE of RI bit width for each CC.

The scheduling unit 204 includes functions configured to perform scheduling for each cell for the user apparatus UE that performs CA, to generate assignment information of PDCCH, and to instruct the DL signal transmission unit 201 to transmit the PDCCH including the assignment information.

<Hardware Configuration>

The block diagrams (FIG. 21 and FIG. 22) used for the description of the above embodiment illustrates blocks in units of functions. These functional blocks (components) are implemented by any combinations of hardware and/or software. Further, a method for implementing each functional block is not particularly limited. Namely, each functional block may be implemented by a single device that is physically and/or logically combined; or may be implemented by a plurality of devices by directly and/or indirectly (e.g., wired and/or wireless) connecting the two or more devices that are physically and/or logically separated.

Figure 23:
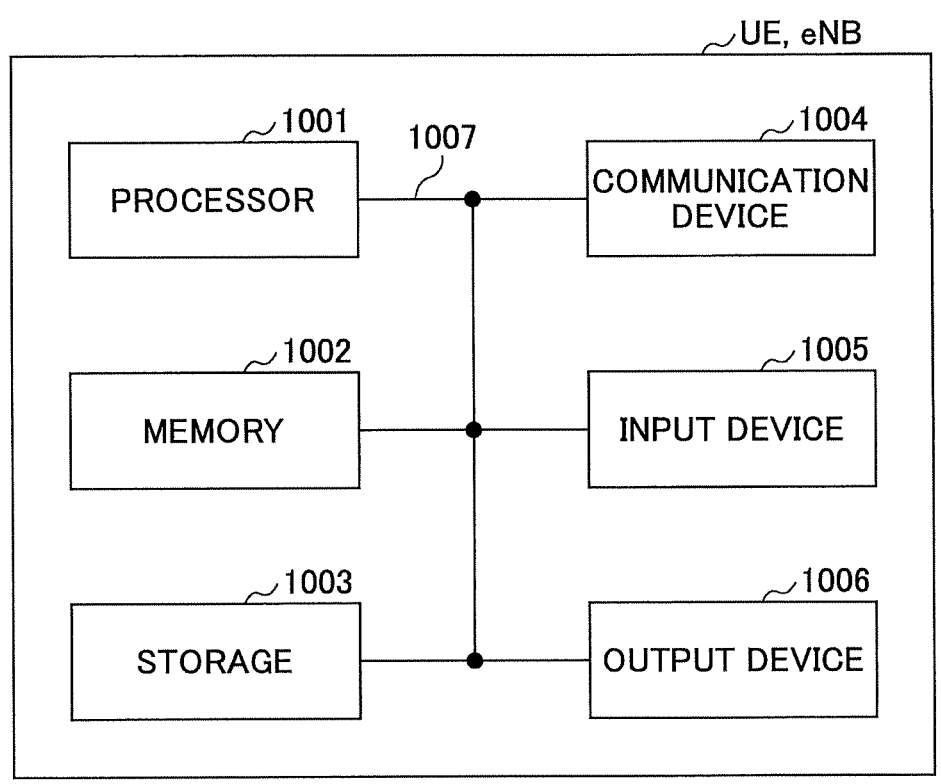
FIG. 23 is a diagram showing an example of hardware configurations of the base station eNB and the user apparatus UE.

For example, the base station eNB and the user apparatus UE according to the embodiment of the present invention may function as computers for executing the process of the radio communication method according to the present invention. FIG. 23 is a diagram illustrating an example of the hardware configurations of the base station eNB and the user apparatus UE according to the embodiment. Each of the above-described base station eNB and the user apparatus UE may be physically configured as a computer device including a processor 1001: a memory 1002: a storage 1003: a communication device 1004; an input device 1005; an output device 1006; a bus 1007, and so forth.

Note that, in the following description, the wording "device" may be replaced with a circuit, a device, a unit, and so forth. The hardware configurations of the base station eNB and the user apparatus UE may be arranged to include one or more of the devices illustrated in the figure; or may be arranged not to include a part of the devices.

Each function of the base station eNB and the user apparatus UE may be implemented by loading predetermined software (a program) onto hardware, such as a processor 1001 and a memory 1002, so that the processor 1001 performs operation to control communication by the communication device 1004, and reading and/or writing data in the memory 1002 and the storage 1003.

The processor 1001 controls the entire computer, for example, by operating an operating system. The processor 1001 may be formed of a central processing unit (CPU: Central Processing Unit) including an interface with peripheral devices; a controller; a processor, a resister, and so forth. For example, the UL signal transmission unit 101, the DL signal reception unit 102, the RRC management unit 103, and the RI bit width determination unit 104 of the user apparatus UE may be implemented by the processor 1001; and the DL signal transmission unit 201, the UL signal reception unit 202, the RRC management unit 203, and the scheduling unit 204 of the base station eNB may be implemented by the processor 1001.

Furthermore, the processor 1001 reads out a program (a program code), a software module, or data from the storage 1003 and/or the communication device 1004 onto the memory 1002; and performs various types of processes according to these. As the program, a program is used which is for causing the computer to execute at least a part of the operation described in the above-described embodiment. For example, the UL signal transmission unit 101, the DL signal reception unit 102, the RRC management unit 103, the soft buffer size determination unit 104, and the RI bit width determination unit 105 of the user apparatus UE may be implemented by a control program that is stored in the memory 1002 and operated by the processor 1001 and the other functional blocks may be implemented in a similar manner; and the DL signal transmission unit 201, the UL signal reception unit 202, the RRC management unit 203, and the scheduling unit 204 of the base station eNB may be implemented by a control program that is stored in the memory 1002 and operated by the processor 1001; and the other functional blocks may be implemented in a similar manner. It is described that the above-described various types of processes are executed by the single processor 1001; however, these can be simultaneously or sequentially executed by two or more processors 1001. The processor 1001 may be implemented by one or more chips. Here, the program may be transmitted from a network via a telecommunication line.

The memory 1002 is a computer readable recording medium; and, for example, it can be formed of at least one of a ROM (Read Only Memory), an EPROM (Erasable Programmable ROM), an EEPROM (Electrically Erasable Programmable ROM), a RAM (Random Access Memory), and so forth. The memory 1002 may be referred to as a resister, a cache, a main memory (a main storage device), and so forth. The memory 1002 can store a program (a program code), a software module, and so forth that can be executed for implementing the communication method according to the embodiment of the present invention.

The storage 1003 is a computer readable recording medium; and, for example, it can be formed of at least one of an optical disk, such as a CD-ROM (Compact Disc ROM); a hard disk drive; a flexible disk; a magneto-optical disk (e.g., a compact disk, a digital versatile disk, a Blu-ray (registered trademark) disk); a smart card; a flash memory (e.g., a card, a stick, a key drive); a Floppy (registered trademark) disk; a magnetic strip, and so forth. The storage 1003 may be referred to as an auxiliary storage device. The above-described storage medium may be, for example, a database including the memory 1002 and/or the storage 1003; a server; or any other suitable medium.

The communication device 1004 is hardware (a transceiver device) for executing communication between computers via a wired and/or wireless network; and, for example, it can be referred to as a network device, a network controller, a network card, a communication module, and so forth. For example, the UL signal transmission unit 101 and the DL signal reception unit 102 of the user apparatus UE may be implemented by the communication device 1004; and the DL signal transmission unit 201 and the UL signal reception unit 202 of the base station eNB may be implemented by the communication device 1004.

The input device 1005 is an input device that receives an input from outside (e.g., a keyboard, a mouse, a microphone, a switch, a button, a sensor, etc.). The output device 1006 is an output device for implementing output toward outside (e.g., a display, a speaker, a LED lamp, etc.). Note that the input device 1005 and the output device 1006 may have an integrated configuration (e.g., a touch panel).

Further, the devices, such as the processor 1001 and the memory 1002, are connected by a bus 1007 for communicating information. The bus 1007 may be formed of a single bus; or may be formed of buses which are different among devices.

Further, each of the base station eNB and the user apparatus UE may be arranged to include hardware, such as a microprocessor, a digital signal processor (DSP: Digital Signal Processor), an ASIC (Application Specific Integrated Circuit), a PLD (Programmable Logic Device), and a FPGA (Field Programmable Gate Array); and a part of or all of the functional blocks may be implemented by the hardware. For example, the processor 1001 may be implemented by at least one of these hardware components.

(Summary of Embodiment)

As described above, according to the present embodiment, there is provided a user apparatus configured to perform communication with a base station in a mobile communication system that supports carrier aggregation, including:
- a transmission unit configured to transmit, to the base station, the numbers of layers for the number of component carriers that form the carrier aggregation as information of downlink MIMO capability; and
- a determination unit configured to determine a bit width for transmitting uplink control information based on the maximum number of layers of the numbers of layers for the number of component carriers transmitted by the transmission unit.

According to the configuration, the user apparatus can properly determine a bit width of uplink control information in a mobile communication system that performs carrier aggregation.

For example, the carrier aggregation is carrier aggregation in which component carriers that are contiguous in one band are arranged. According to this configuration, for example, a bit width of uplink control information can be properly determined when performing intra-band contiguous CA.

The uplink control information is, for example, rank information for each component carrier. According to this configuration, a proper RI bit width suitable for capability of the user apparatus can be determined.

Also, according to the present embodiment, there is provided a user apparatus configured to perform communication with a base station in a mobile communication system that supports carrier aggregation, including:
- a transmission unit configured to transmit, to the base station, the numbers of layers for the number of component carriers that form the carrier aggregation as information of downlink MIMO capability; and
- a reception unit configured to receive, from the base station, the number of layers that is used for determining a bit width for transmitting uplink control information for each of the component carriers that form the carrier aggregation.

According to the configuration, the user apparatus can obtain information for properly determining a bit width of uplink control information in a mobile communication system that performs carrier aggregation.

The user apparatus may include a determination unit configured to determine a bit width for transmitting uplink control information for each component carrier based on the number of layers received by the reception unit. According to this determination unit, a bit width for transmitting uplink control information can be determined.

Also, according to the present embodiment, there is provided a user apparatus configured to perform communication with a base station in a mobile communication system that supports carrier aggregation, including:
- a transmission unit configured to transmit, to the base station, the numbers of layers for the number of component carriers that form the carrier aggregation as information of downlink MIMO capability; and
- a reception unit configured to receive, from the base station, a bit width for transmitting uplink control information for each of the component carriers that form the carrier aggregation.

According to the configuration, the user apparatus can properly determine a bit width of uplink control information in a mobile communication system that performs carrier aggregation.

Also, according to the present embodiment, there is provided a base station that is configured to perform communication with a user apparatus in a mobile communication system that supports carrier aggregation, including:
- a reception unit configured to receive, from the user apparatus, the numbers of layers for the numbers of component carriers that form the carrier aggregation as information of downlink MIMO capability; and
- a transmission unit configured to transmit, to the user apparatus, the number of layers that is used for determining a bit width for transmitting uplink control information for each of the component carriers that form the carrier aggregation.

According to the configuration, the user apparatus can properly determine a bit width of uplink control information in a mobile communication system that performs carrier aggregation.

Also, according to the present embodiment of the present invention, there is provided a base station that is configured to perform communication with a user apparatus in a mobile communication system that supports carrier aggregation, including:
- a reception unit configured to receive, from the user apparatus, the numbers of layers for the numbers of component carriers that form the carrier aggregation as information of downlink MIMO capability; and
- a transmission unit configured to transmit, to the user apparatus, a bit width for transmitting uplink control information for each of the component carriers that form the carrier aggregation.

According to the configuration, the user apparatus can properly determine a bit width of uplink control information in a mobile communication system that performs carrier aggregation.

According to the present embodiment of the present invention, there is provided an uplink control information bit width determination method executed by a user apparatus configured to perform communication with a base station in a mobile communication system that supports carrier aggregation, including:
- a transmission step of transmitting, to the base station, the numbers of layers for the number of component carriers that form the carrier aggregation as information of downlink MIMO capability; and
- a determination step of determining a bit width for transmitting uplink control information based on the maximum number of layers of the numbers of layers for the number of component carriers transmitted by the transmission step.

Also, according to the present embodiment, there is provided an information reception method executed by a user apparatus configured to perform communication with a base station in a mobile communication system that supports carrier aggregation, including:
- a transmission step of transmitting, to the base station, the numbers of layers for the number of component carriers that form the carrier aggregation as information of downlink MIMO capability; and
- a reception step of receiving, from the base station, the number of layers that is used for determining a bit width for transmitting uplink control information for each of the component carriers that form the carrier aggregation.

Also, according to the present embodiment of the present invention, there is provided an information reception method executed by a user apparatus configured to perform communication with a base station in a mobile communication system that supports carrier aggregation, including:
   a transmission step of transmitting, to the base station, the numbers of layers for the number of component carriers that form the carrier aggregation as information of downlink MIMO capability; and
   a reception step of receiving, from the base station, a bit width for transmitting uplink control information for each of the component carriers that form the carrier aggregation.

Also, according to the present embodiment, there is provided an information transmission method executed by a base station that is configured to perform communication with a user apparatus in a mobile communication system that supports carrier aggregation, including:
   a reception step of receiving, from the user apparatus, the numbers of layers for the numbers of component carriers that form the carrier aggregation as information of downlink MIMO capability; and
   a transmission step of transmitting, to the user apparatus, the number of layers that is used for determining a bit width for transmitting uplink control information for each of the component carriers that form the carrier aggregation.

Also, according to the present embodiment of the present invention, there is provided an information transmission method executed by a base station that is configured to perform communication with a user apparatus in a mobile communication system that supports carrier aggregation, including:
   a reception step of receiving, from the user apparatus, the numbers of layers for the numbers of component carriers that form the carrier aggregation as information of downlink MIMO capability; and
   a transmission step of transmitting, to the user apparatus, a bit width for transmitting uplink control information for each of the component carriers that form the carrier aggregation.

Also, according to the each of the above methods, the user apparatus can properly determine a bit width of uplink control information in a mobile communication system that performs carrier aggregation.

The user apparatus UE described in the present embodiment may include a CPU and a memory, and may be realized by executing a program by the CPU (processor), or may be realized by hardware such as hardware circuits including logics of processing described in the embodiment, or may be configured by coexistence of a program and hardware.

The base station eNB described in the present embodiment may include a CPU and a memory, and may be realized by executing a program by the CPU (processor), or may be realized by hardware such as hardware circuits including logics of processing described in the embodiment, or may be configured by coexistence of a program and hardware.

In the above, the embodiment of the present invention has been explained. However, the disclosed invention is not limited to the embodiment. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus and the base station have been explained by using functional block diagrams. However, such an apparatus may be implemented in hardware, software, or a combination thereof.

The software that operates by a processor of the user apparatus according to an embodiment of the present invention and the software that operates by a processor of the base station may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present patent application claims priority based on Japanese patent application No. 2015-118723, filed in the JPO on Jun. 11, 2015, and Japanese patent application No. 2015-121509, filed in the JPO on Jun. 16, 2015, and the entire contents of the Japanese patent application No. 2015-118723 and the Japanese patent application No. 2015-121509 are incorporated herein by reference.

DESCRIPTION OF REFERENCE SIGNS

UE user apparatus
eNB base station
101 DL signal reception unit
102 UL signal transmission unit
103 RRC management unit
104 RI bit width determination unit
201 DL signal transmission unit
202 UL signal reception unit
203 RRC management unit
204 scheduling unit
1001 processor
1002 memory
1003 storage
1004 communication device
1005 input device
1006 output device

The invention claimed is:
1. A user apparatus configured to perform communication with a base station in a mobile communication system that supports carrier aggregation, comprising:
   a transmitter that transmits, to the base station, a first number of layers for each of component carriers that form the carrier aggregation as information of downlink Multiple-Input Multiple-Output (MIMO) capability;
   a receiver that receives, from the base station, a Radio Resource Control message that includes information on a Physical Uplink Control Channel (PUCCH), information on a Channel State Information Reference Signal (CSI-RS) and a second number of layers which is a maximum number of MIMO layers that is used for determining a bit width of a rank indicator for each of the component carriers; and a processor that determines, based on the second number of layers, the bit width of the rank indicator for each of the component carriers, wherein the carrier aggregation is carrier aggregation in which component carriers that are contiguous in one band are arranged.

2. A base station that is configured to perform communication with a user apparatus in a mobile communication system that supports carrier aggregation, comprising:

a receiver that receives, from the user apparatus, a first number of layers for each of component carriers that form the carrier aggregation as information of downlink Multiple-Input Multiple-Output (MIMO) capability; and a transmitter that transmits, to the user apparatus, a Radio Resource Control message that includes information on a Physical Uplink Control Channel (PUCCH), information on a Channel State Information Reference Signal (CSI-RS) and a second number of layers which is a maximum number of MIMO layers that is used for determining a bit width of a rank indicator for each of the component carriers, wherein the user apparatus determines the bit width of the rank indicator for each of the component carriers based on the second number of layers, and wherein the carrier aggregation is carrier aggregation in which component carriers that are contiguous in one band are arranged.

3. An information reception method executed by a user apparatus configured to perform communication with a base station in a mobile communication system that supports carrier aggregation, comprising:

transmitting, to the base station, a first number of layers for each of component carriers that form the carrier aggregation as information of downlink Multiple-Input Multiple-Output (MIMO) capability; and receiving, from the base station, a Radio Resource Control message that includes information on a Physical Uplink Control Channel (PUCCH), information on a Channel State Information Reference Signal (CSI-RS) and a second number of layers which is a maximum number of MIMO layers that is used for determining a bit width of a rank indicator for each of the component carriers; and determining, based on the second number of layers, the bit width of the rank indicator for each of the component carriers, wherein the carrier aggregation is carrier aggregation in which component carriers that are contiguous in one band are arranged.

* * * * *